United States Patent
Hannah et al.

(10) Patent No.: US 9,914,470 B2
(45) Date of Patent: Mar. 13, 2018

(54) SYSTEM WITH WHEEL ASSEMBLY THAT COMMUNICATES WITH DISPLAY UNIT OF HUMAN PROPELLED CART

(71) Applicant: Gatekeeper Systems, Inc., Irvine, CA (US)

(72) Inventors: Stephen E. Hannah, Placentia, CA (US); Scott J. Carter, Seal Beach, CA (US); Jesse M. James, Ladera Ranch, CA (US)

(73) Assignee: Gatekeeper Systems, Inc., Irvine, CA (US)

( * ) Notice: Subject to any disclaimer, the term of this patent is extended or adjusted under 35 U.S.C. 154(b) by 0 days.

(21) Appl. No.: 15/191,303

(22) Filed: Jun. 23, 2016

(65) Prior Publication Data

US 2016/0332653 A1 Nov. 17, 2016

Related U.S. Application Data

(63) Continuation of application No. 15/093,545, filed on Apr. 7, 2016, now Pat. No. 9,676,405, which is a
(Continued)

(51) Int. Cl.
*B62B 5/04* (2006.01)
*B62B 3/14* (2006.01)
(Continued)

(52) U.S. Cl.
CPC ............ *B62B 5/0438* (2013.01); *A47F 10/04* (2013.01); *B60K 25/08* (2013.01); *B60T 7/16* (2013.01);
(Continued)

(58) Field of Classification Search
None
See application file for complete search history.

(56) References Cited

U.S. PATENT DOCUMENTS 4,439,772 A 3/1984 Van Kol
4,651,156 A 3/1987 Martinez
(Continued)

FOREIGN PATENT DOCUMENTS

DE 19717375 A1 10/1998
DE 29909798 U1 9/1999
(Continued)

OTHER PUBLICATIONS

2004 Sales presentation of Gatekeeper Systems, Inc. for its Purchek™ push-out prevention system (of-record in parent application).
(Continued)

*Primary Examiner* — Jonathan M Dager
*Assistant Examiner* — Garrett F Evans
(74) *Attorney, Agent, or Firm* — Knobbe Martens Olson & Bear, LLP

(57) ABSTRACT

A vehicle tracking system includes a wheel assembly containing sensor circuitry capable of sensing one or more types of conditions, such as wheel rotation, wheel vibration caused by skidding, and specific electromagnetic and/or magnetic signals indicative of particular wheel locations. The wheel assembly may also include a brake mechanism. The wheel assemblies may be mounted on shopping carts and used to collect and monitor shopping cart status and location data via a wireless network. In one embodiment, the wheel assembly communicates via a wired or wireless connection with a handlebar mounted display unit of the cart.

28 Claims, 20 Drawing Sheets

Related U.S. Application Data continuation of application No. 14/821,244, filed on Aug. 7, 2015, now Pat. No. 9,322,658, which is a continuation of application No. 13/907,502, filed on May 31, 2013, now Pat. No. 9,758,185, which is a continuation of application No. 11/277,016, filed on Mar. 20, 2006, now Pat. No. 8,463,540.

(60) Provisional application No. 60/663,147, filed on Mar. 18, 2005, provisional application No. 60/663,327, filed on Mar. 18, 2005, provisional application No. 60/663,195, filed on Mar. 18, 2005.

(51) Int. Cl.

| | |
|---|---|
| *A47F 10/04* | (2006.01) |
| *B60K 25/08* | (2006.01) |
| *B60T 7/18* | (2006.01) |
| *G01C 21/00* | (2006.01) |
| *G01C 21/12* | (2006.01) |
| *G06Q 10/08* | (2012.01) |
| *G08B 13/24* | (2006.01) |
| *G08G 1/00* | (2006.01) |
| *H02K 7/18* | (2006.01) |
| *B60T 7/16* | (2006.01) |
| *H04W 4/02* | (2018.01) |
| *G01C 21/20* | (2006.01) |
| *B62B 5/00* | (2006.01) |
| *G06K 7/10* | (2006.01) |

(52) U.S. Cl.
CPC .............. *B60T 7/18* (2013.01); *B62B 3/14* (2013.01); *B62B 3/1404* (2013.01); *B62B 3/1412* (2013.01); *B62B 3/1424* (2013.01); *B62B 3/1492* (2013.01); *B62B 5/0003* (2013.01); *B62B 5/048* (2013.01); *B62B 5/0423* (2013.01); *G01C 21/00* (2013.01); *G01C 21/12* (2013.01); *G01C 21/206* (2013.01); *G06K 7/10366* (2013.01); *G06Q 10/08* (2013.01); *G08B 13/2434* (2013.01); *G08B 13/2448* (2013.01); *G08B 13/2462* (2013.01); *G08B 13/2482* (2013.01); *G08G 1/20* (2013.01); *H02K 7/1846* (2013.01); *H04W 4/02* (2013.01); *H04W 4/028* (2013.01); *G08B 13/246* (2013.01); *G08B 13/2474* (2013.01); *G08B 13/2477* (2013.01); *Y10T 16/195* (2015.01); *Y10T 29/49826* (2015.01)

(56) References Cited

U.S. PATENT DOCUMENTS

| | | |
|---|---|---|
| 4,656,476 A | 4/1987 | Tavtigian |
| 4,831,363 A | 5/1989 | Wolf |
| 4,862,160 A | 8/1989 | Ekchian et al. |
| 4,973,952 A | 11/1990 | Malec et al. |
| 5,053,768 A | 10/1991 | Dix, Jr. |
| 5,068,654 A | 11/1991 | Husher |
| 5,250,789 A | 10/1993 | Johnsen |
| 5,283,550 A | 2/1994 | MacIntyre |
| 5,287,266 A | 2/1994 | Malec et al. |
| 5,295,064 A | 3/1994 | Malec et al. |
| 5,315,290 A | 5/1994 | Moreno et al. |
| 5,357,182 A | 10/1994 | Wolfe et al. |
| 5,406,271 A | 4/1995 | Sonnendorfer et al. |
| 5,434,781 A | 7/1995 | Alofs et al. |
| 5,438,319 A | 8/1995 | Zeytoonjian et al. |
| 5,485,520 A | 1/1996 | Chaum et al. |
| 5,512,879 A | 4/1996 | Stokes |
| 5,557,513 A | 9/1996 | Frey et al. |
| 5,610,586 A | 3/1997 | Zeytoonjian et al. |
| 5,625,569 A | 4/1997 | Trimmer et al. |
| 5,630,600 A | 5/1997 | Pasillas |
| 5,640,002 A * | 6/1997 | Ruppert .............. G06K 7/0008 235/383 |
| 5,640,146 A | 6/1997 | Campana, Jr. |
| 5,646,616 A | 7/1997 | Komatsu |
| 5,719,555 A | 2/1998 | Zeytoonjian et al. |
| 5,806,862 A * | 9/1998 | Merryman ............ B62B 5/0423 188/111 |
| 5,821,512 A | 10/1998 | O'Hagan et al. |
| 5,821,513 A | 10/1998 | O'Hagan et al. |
| 5,825,286 A | 10/1998 | Coulthard |
| 5,835,868 A | 11/1998 | McElroy et al. |
| 5,844,130 A | 12/1998 | Hilgrat |
| 5,877,962 A | 3/1999 | Radcliffe |
| 5,883,968 A | 3/1999 | Welch et al. |
| 5,944,659 A | 8/1999 | Flach et al. |
| 5,974,312 A | 10/1999 | Hayes, Jr. et al. |
| 5,999,099 A | 12/1999 | Stobbe |
| 6,002,348 A | 12/1999 | Greene et al. |
| 6,024,655 A | 2/2000 | Coffee |
| 6,078,826 A | 6/2000 | Croft et al. |
| 6,102,414 A | 8/2000 | Schweninger |
| 6,123,259 A | 9/2000 | Ogasawara |
| 6,125,972 A | 10/2000 | French |
| 6,127,927 A | 10/2000 | Durban et al. |
| 6,173,817 B1 * | 1/2001 | Gray .................... B62B 5/0423 188/1.12 |
| 6,177,880 B1 | 1/2001 | Begum |
| 6,201,473 B1 | 3/2001 | Schaffer |
| 6,220,379 B1 | 4/2001 | Schugt et al. |
| 6,244,366 B1 | 6/2001 | Otterson et al. |
| 6,310,963 B1 | 10/2001 | Erdol et al. |
| 6,362,728 B1 | 3/2002 | Lace et al. |
| 6,446,005 B1 | 9/2002 | Bingeman et al. |
| 6,477,542 B1 | 11/2002 | Papaioannou |
| 6,502,669 B1 | 1/2003 | Harris |
| 6,529,164 B1 | 3/2003 | Carter |
| 6,563,427 B2 | 5/2003 | Bero et al. |
| 6,587,835 B1 | 7/2003 | Treyz et al. |
| 6,700,493 B1 | 3/2004 | Robinson |
| 6,809,645 B1 | 10/2004 | Mason |
| 6,820,062 B1 | 11/2004 | Gupta et al. |
| 6,894,614 B2 | 5/2005 | Eckstein et al. |
| 6,911,908 B1 | 6/2005 | Beart |
| 6,928,343 B2 | 8/2005 | Cato |
| 6,945,366 B2 | 9/2005 | Taba |
| 6,971,464 B2 | 12/2005 | Marino et al. |
| 6,972,683 B2 | 12/2005 | Lestienne et al. |
| 7,053,823 B2 | 5/2006 | Cervinka et al. |
| 7,084,765 B2 | 8/2006 | Clapper |
| 7,183,910 B2 | 2/2007 | Alvarez et al. |
| 7,199,709 B2 | 4/2007 | Parsons |
| 7,203,579 B2 | 4/2007 | Yokota et al. |
| 7,218,225 B2 | 5/2007 | Wieth et al. |
| 7,277,010 B2 | 10/2007 | Joao |
| 7,397,373 B2 | 7/2008 | Hunt |
| 7,420,461 B2 | 9/2008 | Nebolon et al. |
| 8,046,160 B2 | 10/2011 | Carter et al. |
| 8,406,993 B2 | 3/2013 | Hannah et al. |
| 8,417,445 B2 | 4/2013 | Hannah et al. |
| 8,433,507 B2 | 4/2013 | Hannah et al. |
| 8,463,540 B2 | 6/2013 | Hannah et al. |
| 8,473,192 B2 | 6/2013 | Hannah et al. |
| 8,478,471 B2 | 7/2013 | Hannah et al. |
| 8,558,698 B1 | 10/2013 | Hannah et al. |
| 8,570,171 B2 | 10/2013 | Hannah et al. |
| 8,571,778 B2 | 10/2013 | Hannah et al. |
| 8,606,501 B2 | 12/2013 | Hannah et al. |
| 8,700,230 B1 | 4/2014 | Hannah et al. |
| 8,718,923 B2 | 5/2014 | Hannah et al. |
| 9,091,551 B2 | 7/2015 | Hannah et al. |
| 9,322,658 B2 | 4/2016 | Hannah et al. |
| 9,403,548 B2 | 8/2016 | Hannah et al. |
| 2001/0000959 A1 | 5/2001 | Campana, Jr. |
| 2001/0017588 A1 | 8/2001 | Symonds et al. |
| 2001/0028301 A1 | 10/2001 | Geiger et al. |
| 2002/0003501 A1 | 1/2002 | Kushida |

(56) References Cited

U.S. PATENT DOCUMENTS

| | | |
|---|---|---|
| 2002/0027531 A1 | 3/2002 | Brown |
| 2002/0097182 A1 | 7/2002 | Goren et al. |
| 2002/0161651 A1 | 10/2002 | Godsey et al. |
| 2002/0167916 A1 | 11/2002 | Clapper |
| 2002/0196151 A1 | 12/2002 | Troxler |
| 2003/0043073 A1 | 3/2003 | Gray et al. |
| 2003/0043941 A1 | 3/2003 | Johnson et al. |
| 2003/0059288 A1 | 3/2003 | Robinson |
| 2003/0102969 A1 | 6/2003 | Parsons |
| 2003/0155891 A1 | 8/2003 | Ishishita |
| 2003/0206102 A1 | 11/2003 | Joao |
| 2003/0214419 A1 | 11/2003 | Reindl |
| 2003/0224759 A1 | 12/2003 | Burnett |
| 2003/0234578 A1 | 12/2003 | Takahashi et al. |
| 2004/0130457 A1 | 7/2004 | Ueda et al. |
| 2004/0161026 A1 | 8/2004 | Jensen et al. |
| 2004/0169589 A1 | 9/2004 | Lea et al. |
| 2004/0192399 A1* | 9/2004 | DeCost ............ G06Q 30/02 455/566 |
| 2004/0215532 A1 | 10/2004 | Boman et al. |
| 2004/0217166 A1* | 11/2004 | Myers ............ G06Q 20/343 235/383 |
| 2004/0230370 A1 | 11/2004 | Tzamaloukas |
| 2004/0243262 A1 | 12/2004 | Hofmann |
| 2005/0018543 A1 | 1/2005 | Fujisawa |
| 2005/0027443 A1* | 2/2005 | Cato ............ G06Q 10/0875 701/472 |
| 2005/0046570 A1 | 3/2005 | Conzola et al. |
| 2005/0049914 A1 | 3/2005 | Parish |
| 2005/0104307 A1 | 5/2005 | Roseman |
| 2005/0138077 A1 | 6/2005 | Michael et al. |
| 2005/0194218 A1 | 9/2005 | D'Arca |
| 2005/0259240 A1 | 11/2005 | Goren |
| 2006/0042734 A1 | 3/2006 | Turner et al. |
| 2006/0067226 A1 | 3/2006 | Chandra et al. |
| 2006/0136303 A1 | 6/2006 | Bell et al. |
| 2006/0152195 A1 | 7/2006 | Ishishita |
| 2006/0208902 A1 | 9/2006 | Brey |
| 2006/0247847 A1 | 11/2006 | Carter et al. |
| 2006/0249320 A1 | 11/2006 | Carter et al. |
| 2006/0279421 A1 | 12/2006 | French et al. |
| 2007/0008068 A1 | 1/2007 | Brice et al. |
| 2007/0225879 A1 | 9/2007 | French et al. |
| 2008/0115997 A1 | 5/2008 | Benno et al. |
| 2012/0320199 A1 | 12/2012 | Kundu et al. |
| 2013/0257000 A1 | 10/2013 | Hannah et al. |
| 2013/0264786 A1 | 10/2013 | Hannah et al. |
| 2014/0236410 A1 | 8/2014 | Takizawa et al. |
| 2015/0325093 A1 | 11/2015 | Hannah et al. |
| 2015/0344055 A1 | 12/2015 | Hannah et al. |
| 2016/0288811 A1 | 10/2016 | Hannah et al. |

FOREIGN PATENT DOCUMENTS

| | | |
|---|---|---|
| EP | 1126421 A2 | 8/2001 |
| FR | 2258294 A1 | 8/1975 |
| WO | WO 98/34819 A1 | 8/1998 |
| WO | WO 98/51197 A1 | 11/1998 |
| WO | WO 2001/027891 A1 | 4/2001 |
| WO | WO 2016/114987 A1 | 7/2016 |

OTHER PUBLICATIONS

English translation, with attachments, of initial office action issued in counterpart Chinese application No. 200680016621.2, which corresponds to WO 2006/102183 (of-record in parent application).

Office Action dated Aug. 6, 2009, in U.S. Appl. No. 12/200,735 (of-record in parent application).

Press release dated Apr. 28, 2005, titled Purchek™—a Trolley-based Anti-theft Solution from Gatekeeper Garners Huge Attention at the 2005 Retail Middle East Exhibition (of-record in parent application).

Press release titled "Gatekeeper Systems announces new product launch," dated Feb. 18, 2005 (of-record in parent application).

Supplemental European Search Report dated Jan. 15, 2015, in European Application No. EP 06 74 8454 (of-record in parent application).

European Search Report dated Feb. 8, 2017, in European Application No. EP 16 17 9519.

European Search Report dated Feb. 1, 2017, in European Application No. EP 16 17 9514.

Office Action in related Chinese Application No. 200680016621.2, dated Feb. 6, 2009 (w/translation).

Office Action in related Chinese Application No. 200680016621.2, dated Nov. 27, 2009 (w/translation).

Office Action in related Chinese Application No. 200680016621.2, dated Dec. 2, 2010 (w/translation).

Office Action in related Canadian Application No. 2,601,565, dated Feb. 1, 2013 (w/translation).

Office Action in related Canadian Application No. 2,601,565, dated Dec. 30, 2013.

International Preliminary Report on Patentability in related International Patent Application No. PCT/US2006/009921, dated Nov. 8, 2007.

International Search Report and Written Opinion for International Application No. PCT/US2016/012606, dated May 13, 2016, in 17 pages.

Complaint for patent infringement filed by Gatekeeper Systems, Inc. in the Southern District of California against Carttronics LLC, dated Oct. 21, 2013 (case No. 13CV2531 BEN JMA).

First Amended Answer and Counterclaim of Carttronics dated Jan. 13, 2014, in matter of *Gatekeeper Systems, Inc. v. Carttronics LLC* (case No. 13CV2531 BEN JMA).

Gatekeeper's Reply to Carttronics' First Amended Counterclaim dated Feb. 12, 2014, in matter of *Gatekeeper Systems, Inc. v. Carttronics LLC* (case No. 13CV2531 BEN JMA).

Invalidity Contentions of Carttronics LLC and Cartronics, Inc. dated May 16, 2014, in matter of *Gatekeeper Systems, Inc. v. Carttronics LLC* (case No. 13CV2531 BEN JMA).

Gatekeeper Systems, Inc.'s Preliminary Invalidity Contentions dated May 16, 2014, in matter of *Gatekeeper Systems, Inc. v. Carttronics LLC* (case No. 13CV2531 BEN JMA).

Defendants' Preliminary Proposed Claim Constructions, dated Jun. 25, 2014, in matter of *Gatekeeper Systems, Inc, v. Carttronics LLC and Carttronics, Inc.* (case No. 13CV2531-BEN).

* cited by examiner

SYSTEM WITH WHEEL ASSEMBLY THAT COMMUNICATES WITH DISPLAY UNIT OF HUMAN PROPELLED CART

RELATED APPLICATIONS

This application is a continuation of U.S. application Ser. No. 15/093,545, filed Apr. 7, 2016, which is a continuation of U.S. application Ser. No. 14/821,244 (now U.S. Pat. No. 9,322,658), filed Aug. 7, 2015, which is a continuation of U.S. application Ser. No. 13/907,502, filed May 31, 2013, which is a continuation of U.S. application Ser. No. 11/277,016, filed Mar. 20, 2006 (now U.S. Pat. No. 8,463,540), which claims the benefit under 35 U.S.C. §119(e) of U.S. Provisional Patent Appl. Nos. 60/663,147, 60/663,327, and 60/663,195, all filed on Mar. 18, 2005. The aforesaid applications are hereby incorporated by reference. In addition, the disclosures of the following non-provisional applications are hereby incorporated by reference: U.S. patent application Ser. No. 11/277,027, filed Mar. 20, 2006, titled NAVIGATION SYSTEMS AND METHODS FOR WHEELED OBJECTS (hereinafter "the Navigation Patent Application"), and U.S. patent application Ser. No. 11/277,029, filed Mar. 20, 2006, titled POWER GENERATION SYSTEMS AND METHODS FOR WHEELED OBJECTS (hereinafter "the Power Generation Patent Application").

BACKGROUND

Field of the Invention

The present invention relates to systems for tracking the movement and statuses of non-motorized vehicles, including but not limited to shopping carts.

Description of the Related Art

A variety of commercially available cart containment systems exist for deterring the theft of shopping carts. Typically, these systems include a wire that is embedded in the pavement of a store parking lot to define an outer boundary of area in which shopping cart use is permitted. When a shopping cart is pushed over this wire, a sensor in or near one of the wheels detects an electromagnetic signal generated via the wire, causing the wheel to lock. To unlock the wheel, an attendant typically uses a handheld remote control to send an unlock signal to the wheel.

While existing cart containment systems are useful for deterring shopping cart theft, they are generally not capable of detecting other types of shopping cart misuse. As one example, existing systems are unable to detect that a shopping cart is being used to steal groceries or other merchandise. While merchandise theft can often be detected using an Electronic Article Surveillance (EAS) system, the cost and burden of attaching EAS tags to merchandise items is often impractical. As another example of misuse, merchants that use power-assisted cart retrieval units sometimes use these machines to retrieve too many carts at a time, or to push a cart having a locked or improperly oriented wheel.

This background section is not intended to suggest that the present invention is limited to shopping carts, or that the invention requires detection of the particular types of misuse described above.

SUMMARY OF THE DISCLOSURE

The present invention comprises a system for tracking the locations and statuses of vehicles, such as shopping carts. Each vehicle includes a wheel or wheel assembly that includes sensor circuitry for sensing various types of events. (The term "invention" is used in this document to refer generally and collectively to various distinct inventions and inventive features, and its use herein does not limit the scope of protection.) The types of sensors included in the wheel assembly may vary widely, but may include, for example, any one or more of the following: (1) a wheel rotation sensor, (2) a vibration sensor for sensing wheel skid events, (3) a VLF (Very Low Frequency) signal detector for detecting signals used by conventional cart containment systems, (4) an EAS (Electronic Article Surveillance) signal detector capable of detecting conventional EAS towers, and/or (5) a magnetic field sensor capable of detecting encoded magnetic markers placed on or under store flooring or pavement to mark specific locations. The wheel may also include a braking mechanism that can be actuated to lock the wheel from rotating, although braking mechanisms may be omitted in some embodiments.

The wheel's sensor circuitry is coupled to a radio frequency (RF) transceiver system, which may but need not also be housed in the wheel or wheel assembly. The RF transceiver system provides a two-way data link that may be used to retrieve status information from, and send commands to, specific vehicles. The RF transceiver system is preferably capable of measuring and reporting the signal strengths of transmissions it receives, such as transmissions from wireless access points and/or other vehicles.

The retrieved status information may be used to track locations of the vehicles in real time or near real time, and to make decisions on whether to authorize or block particular vehicle actions. For example, in the context of a shopping cart that is exiting a store, the data acquired via two-way communications with the cart may be used to determine whether the cart passed through a checkout lane. If it did not, a lock command may be transmitted to the cart, or an "exit authorized" command withheld, to cause the wheel to lock. (Various other types of actions may additionally or alternatively be taken, such as sounding an alarm or activating a video surveillance system.) The determination of whether to treat the exit event as unauthorized may also be based on other types of data, such as any one or more of the following: (1) whether the corresponding checkout register/scanner was active, as may be determined, e.g., from a central store computer or via a network-connected sensor at the checkout station; (2) the average speed at which the cart passed through the checkout lane, as may be determined, e.g., from a rotation sensor in the wheel, (3) the amount of time spent in the store, (4) whether the cart passed through an area that includes high-priced or frequently stolen merchandise.

The sensor or sensor-based data collected from the vehicles may also be used for a variety of other applications. For example, in applications involving power-assisted cart retrieval, a vibration sensor may be included in the wheel to detect and report wheel skid events. Such skid events commonly occur when a retrieval unit retrieves a cart having a locked or improperly oriented wheel, and can cause damage to the wheels and the retrieval unit. The reported skid event message may be used to automatically disable the cart retrieval unit and/or to alert its operator.

As another example, signal strength measurements taken by the vehicle's RF transceivers can be analyzed collectively, such as by using a clustering algorithm, to estimate the number of carts currently queued or otherwise clustered at a checkout station, in a cart retrieval line, at a cart park area, or elsewhere. This information may be used for various purposes, such as to alert store personnel of the need to open a checkout lane or to retrieve carts, or to automatically disable a cart retrieval unit that is attempting to retrieve more than an authorized number of carts at a time.

In some shopping cart based embodiments, each cart may be provided with a display unit that contains or is coupled to the cart's RF transceiver. In these embodiments, the location data obtained via two-way communications with a cart may be used to select messages to present on the display unit to a customer. For instance, when a shopping cart enters a particular area or department of the store, an advertisement or other message may be displayed that is specific to that area or department. If the customer's identity is known (e.g., as the result of the customer swiping a customer loyalty card via the display unit), the ad or message may be targeted and/or personalized based, e.g., on the past shopping activities of the customer.

The data obtained via two-way communications with the carts may also be analyzed on an aggregated basis for store planning purposes. For example, the paths followed by customers, and the amounts of time spent in particular areas or departments, can be collectively analyzed to identify areas that are the most or least frequently visited by customers. As another example, when a checkout event is detected, the system may associate the customer/cart's path in the store with the associated transaction record, including identifiers of the products purchased; this data may be mined on an aggregated basis via data mining software to detect, e.g., that customers commonly have difficulty locating particular products, or to detect that customers commonly linger in a particular area without selecting an item to purchase.

The invention also comprises a mechanized cart retrieval unit that is capable of instructing the shopping carts it is pushing or pulling to maintain their wheels in an unlocked state. The cart retrieval unit may also instruct one or more carts at the front of the nest to apply weak or partial braking so that the carts do not become un-nested during retrieval. In addition, the invention comprises techniques for using directional antennas to create lock and unlock zones for containing vehicles in a defined area.

The various inventive features described herein are applicable to a wide range of different types of vehicles, including but not limited to shopping carts, luggage carts, wheelchairs, hospital beds, gurneys, pharmacy carts, and carts used for medical and other equipment.

Neither the foregoing summary nor the following detailed description defines or limits the scope of protection. The scope of protection is defined by the claims.

BRIEF DESCRIPTION OF THE DRAWINGS

Specific embodiments of the invention will now be described with reference to the drawings summarized below. These specific embodiments are intended to illustrate, and not limit, the invention. The invention is defined by the claims.

DETAILED DESCRIPTION OF PREFERRED EMBODIMENTS

I. Overview (FIGS. 1 and 2)

Figure 1:
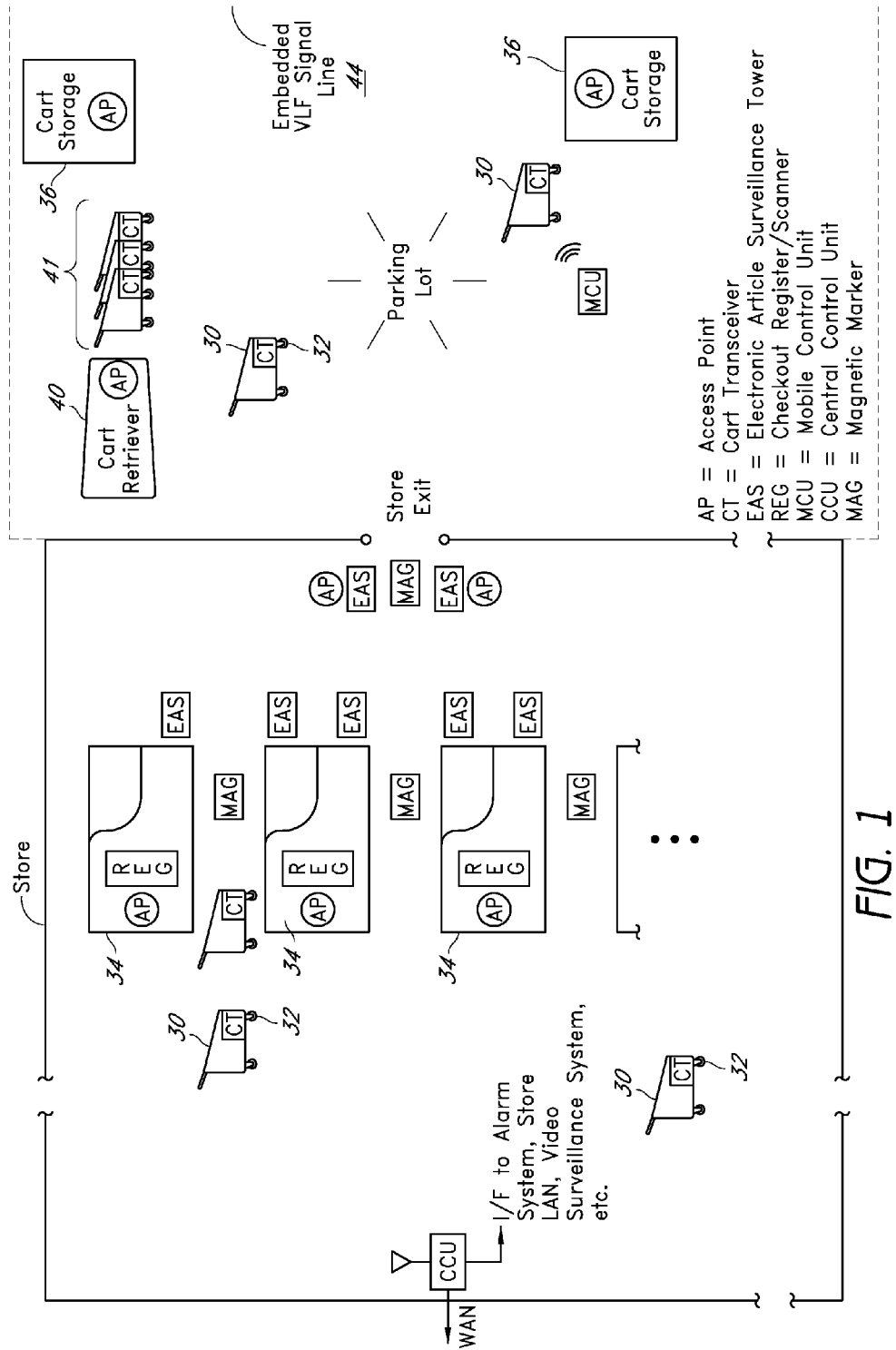
FIG. 1 illustrates various types of system components that may be deployed in and around a store for purposes of tracking shopping carts.
Figure 2:
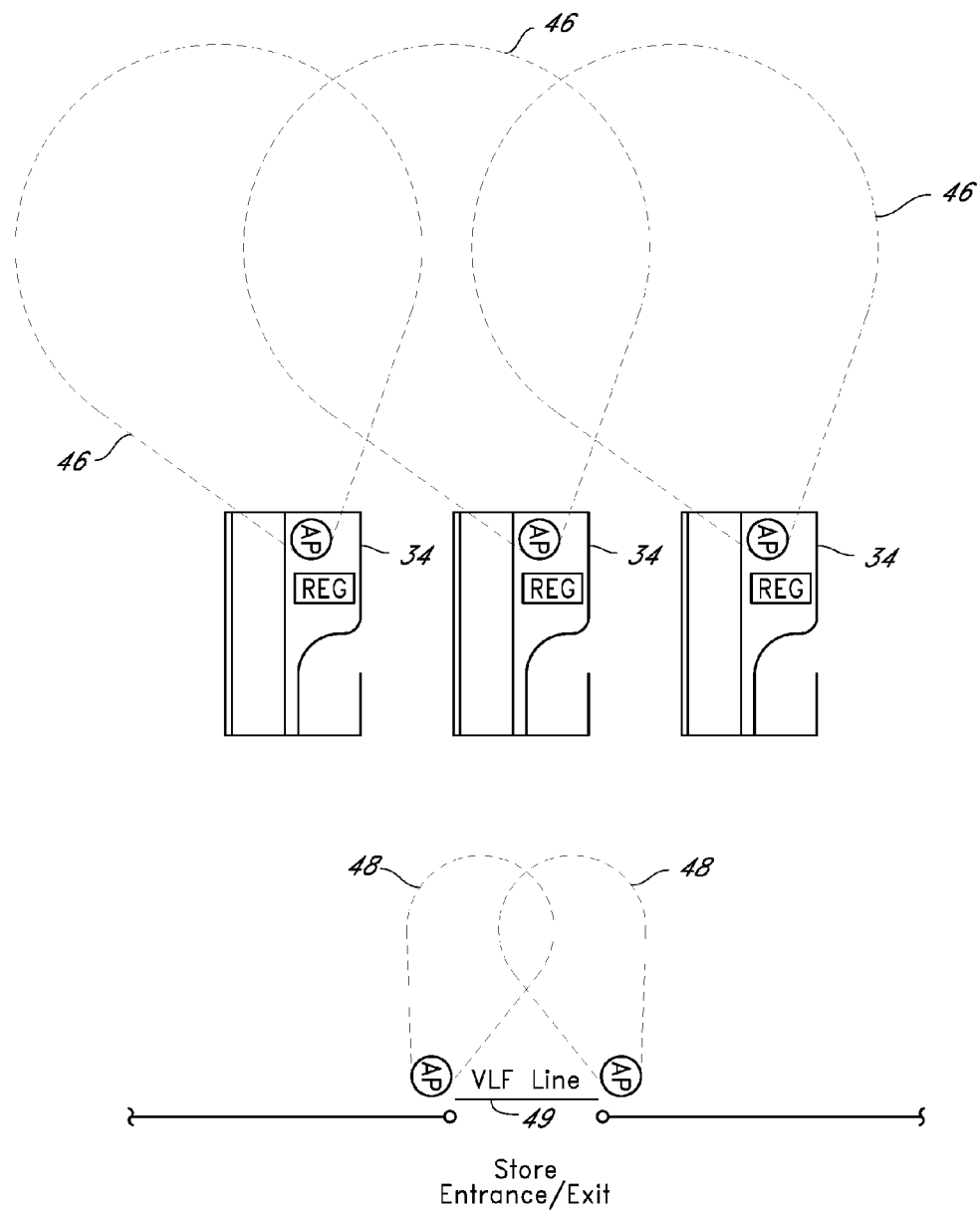
FIG. 2 illustrates one possible configuration that may be used to detect whether a customer who is exiting the store has paid.

FIG. 1 illustrates a vehicle tracking system according to one embodiment of the invention. The vehicle tracking system is shown deployed in a store for purposes of tracking and controlling the movement of shopping carts 30. However, the inventive components and methods of the vehicle tracking system may be used for other applications, such as tracking luggage carts in an airport, stretchers in a hospital, or carts in a warehouse.

The system includes a set of cart transceivers (CTs) that communicate bi-directionally with a set of wireless access points (APs) to create two-way communications links with the shopping carts 30. In one embodiment, each cart transceiver (CT) is fully contained within one of the standard-size (5-inch diameter) wheels 32 (typically a front wheel) of a respective shopping cart 30, together with a braking unit that can be actuated by the cart transceiver to lock the wheel. One example of a braking unit that may be used for this purpose is described in U.S. Pat. No. 6,362,728, the disclosure of which is hereby incorporated by reference. (For purposes of this detailed description, the term "cart transceiver" refers collectively to the cart's RF transceiver and the associated sensor circuitry). Alternatively, a progressive or partial braking unit may be used that is additionally capable of inhibiting the wheel's rotation without placing the wheel in a locked state.

Some of the circuitry of the cart transceivers (CTs) may alternatively be provided elsewhere on the shopping carts 30. For example, as described below, some of the transceiver circuitry may alternatively be included in a display unit that attaches to the shopping cart's handle (see FIG. 9, discussed below). As another example, some or all of the circuitry, including sensor circuitry, could be housed in the wheel assembly (e.g., in the wheel's caster or fork) without being included in the wheel itself.

The access points (APs) are generally responsible for communicating with the cart transceivers (CTs) for purposes of retrieving and generating cart status information, including information indicative or reflective of cart location. The types of cart status information that may be retrieved and monitored include, for example, whether the wheel 32 is in a locked versus unlocked state, whether the cart is moving; the wheel's average rotation speed (as may be sensed using a rotation sensor in the wheel 32); whether the cart has detected a particular type of location-dependent signal such as a VLF, EAS or magnetic signal (discussed below); whether the wheel 32 is skidding; the CT's battery level and a general wheel "health"; and the number of lock/unlock cycles experienced by the cart since some reference time. (The term "wheel 32" is used herein to refer specifically to a wheel that includes electronics as described herein, as opposed to the other wheels of the shopping cart.) The access points (APs) are also capable of generating and/or relaying commands to the cart transceivers (CTs), including lock and unlock commands that are sent to specific shopping carts.

In the embodiment shown in FIG. 1, all of the access points (APs) communicate wirelessly with a central control unit (CCU), either directly or via intermediate access points. The central control unit may be implemented as a personal computer that includes a wireless transceiver card or which is wire-connected to an external transceiver unit. The CCU is generally responsible for collecting, storing and analyzing cart status information, including location information, gathered by the access points (APs). In addition to the data retrieved from the cart transceivers (CTs), the CCU may collect data generated by the access points, such as signal strength measurements of detected cart transmissions. Some or all of the collected data is preferably stored by the CCU together with associated event timestamps.

The CCU may analyze the collected data in real time for purposes of making decisions, such as whether to send a lock command to a particular cart 30 or whether to send an alert message to personnel. For example, when a cart is approaching or passing through the store exit, the CCU may analyze the cart's recent history (e.g., path and speed) to evaluate whether a customer is attempting to leave the store without paying. (The access points may additionally or alternatively be responsible for making such determinations.) Based on the outcome of this determination, the CCU may send a lock command to the cart (typically via an access point), or may refrain from issuing a command that authorizes the cart to exit. As another example, if the CCU detects a rapid increase in the number of active carts, the CCU may alert personnel (e.g., over a store LAN) regarding the possible need to open an additional checkout station.

The CCU may also run data mining and reporting software that analyzes the data collected over time for purposes of detecting meaningful traffic patterns and trends. For example, the CCU may generate reports showing how customers typically progress through the store, and how much time they spend in each aisle or other shopping area. This information may be used to, for example, adjust the store layout.

The CCU may additionally or alternatively convey the data it collects over a cellular network or the Internet to a remote node that handles analysis and reporting tasks. For example, the CCU (and possibly one or more access points) may have an autonomous WAN link that uses a cellular data service such as GPRS to convey the collected data to a remote node for analysis and reporting. This feature can be used to monitor the system's health from a remote facility. The system may also be capable of being tested and configured via the WAN link from the remote facility.

As depicted in FIG. 1, the CCU may connect to various other types of systems that exist within the store. For example, the CCU may connect to a preexisting alarm system and/or video surveillance system, in which case the CCU may be configured to activate an audible alarm or a video camera upon detecting an unauthorized exit event. As another example, the CCU may connect to a pre-existing central store computer that maintains information regarding the states of the store's checkout registers; as described below, this information may be retrieved and used by the CCU to evaluate whether a customer has passed through an active checkout lane.

In some implementations of the system, the CCU may be omitted. In these implementations, the access points (APs) may implement all of the real time analysis functionality that might otherwise be handled by the CCU. For example, an access point mounted in the vicinity of the store exit may be capable of detecting that a customer is attempting to exit the store without paying, and deciding whether to send a lock command to the cart. To accommodate both centralized and distributed of installations, each access point may be capable of operating both with and without a CCU. Implementations are also possible in which the access points are omitted, such that the CCU communicates directly with the cart transceivers.

The cart transceivers (CTs), access points (APs), and central control unit (CCU) all operate as uniquely addressable nodes on a wireless tracking network. As shown in FIG. 1, another type of node that may be included on the network is a handheld mobile control unit (MCU). The mobile control unit is designed to enable store personnel to unlock individual carts via depression of a button, as is known in the art. The mobile control unit may also include functionality for retrieving and displaying various types of cart status information, for configuring the wheels/cart transceivers and updating their firmware, and for controlling a motorized cart retrieval unit 40 (see discussion of cart retriever 40 below).

The various types of nodes (e.g., cart transceivers, access points, central control unit, and mobile control unit) communicate with each other using a non-standard wireless communications protocol that enables the cart transceivers to operate at very low duty cycles, without the need to maintain synchronization with the access points when inactive. Consequently, the cart transceivers can operate for extended periods of time (e.g., approximately 3 years with an average of 0.7 lock/unlock events per day) using a relatively small battery, such as one CR123A ($LiMnO_2$) battery or two L91 ($LiFeS_2$) batteries mounted in the wheel 32. The details of a particular communications protocol that may be used are described below under the heading "Communications Protocol."

Each cart transceiver (CT) is preferably capable of measuring the received signal strength, in terms of an RSSI (received signal strength indication) value, of the transmissions it receives on the wireless tracking network. The system may use these RSSI measurements in various ways. For example, a cart transceiver may compare the RSSI value of an access point's transmission to a threshold value to determine whether to respond to the transmission. The cart transceiver may also report this RSSI value to the access point (together with the cart transceiver's unique ID) to enable the system to estimate the location of, or distance to, the shopping cart. As another example, the cart transceivers may be programmed to generate and report RSSI values of transmissions from other nearby cart transceivers; this information may in turn be used to estimate the number of carts that are queued at a checkout lane, in a cart storage structure, in a cart stack being retrieved with a mechanized cart retrieval unit 40, or elsewhere. One example of a method that may be used to estimate the number of queued or clustered carts in a particular area is described below under the heading "Queued Count Estimation."

Three checkout stations 34 are shown in FIG. 1, each of which includes a checkout register (REG), which typically includes a merchandise scanner. Each checkout station 34 in this particular example includes an access point (AP), which may be mounted to the preexisting pole (if present) that indicates the number of the checkout lane. Each such access point may include a connection or sensor that enables it to determine whether the respective checkout station is currently active. This information is useful for assessing whether a customer who passes through the checkout lane has paid. Several different methods that may be used to sense the active/inactive state of a checkout station are described below. Each access point that is positioned at a checkout station 34 may use a directional antenna to communicate with nearby shopping carts/cart transceivers, such as those that are queued in the corresponding checkout lane (see FIG. 2, discussed below).

Access points may additionally or alternatively be mounted to various other fixed and/or mobile structures in the vicinity of the store. For example, as shown in FIG. 1, access points may be mounted to a shopping cart storage structure 36 (two shown) in the store parking lot. These parking-structure-mounted access points may be used to detect and report the number of carts stored in their respective areas, and may also be used to enable the in-store access points or CCU to communicate with carts that would otherwise be out of range.

As illustrated in FIG. 1, an access point (AP) may also be mounted on a power-assisted (mechanized) cart retrieval unit or trolley 40, which may be either a cart pusher or cart puller. One example of such a retrieval unit 40 is the CartManager™ product of Gatekeeper Systems, Inc. The retriever-mounted access point may serve various functions related to cart retrieval, including one or more of the following: (1) sending unlock commands to a nest 41 of carts 30 being retrieved, such that the wheels 32 of these carts are not damaged by being retrieved while in a locked state, (2) detecting whether the cart retriever 40 is being used to push or pull more than an authorized number (e.g., 15) carts at a time, and disabling the cart retriever 40, and/or reporting the event, if such misuse is detected, (3) in embodiments in which the wheel 32 or wheel assembly supports partial braking, instructing the cart or carts at the front of the nest 41 (particularly in the case of a cart pusher) to apply weak braking so that the carts do not become un-nested, with the degree of braking applied optionally being dependent upon the detected slope of the ground; and (4) in embodiments in which the wheels 32 include vibration sensors for detecting wheel skid events, responding to skid-event messages from the carts being retrieved by disabling the cart retriever 40 and/or alerting an operator. It should be noted that in many cases the wheel skid events occur because a cart being retrieved is mis-nested such that the skidding wheel cannot swivel to point in the correct direction. A flow chart illustrating logic that may be implemented by the cart transceivers (CTs) to facilitate retrieval operations is provided as FIG. 20 and is discussed below.

In one embodiment, the cart retrieval unit 40 is a battery powered cart pusher that is adapted to be positioned at the rear of a cart stack to be retrieved. The operator manually steers the cart stack by holding the front cart with one hand while holding the MCU in the other hand. Via a set of buttons on the MCU, the operator can control the forward and backward direction and speed of the retriever 40. Various type of status information may be displayed to the operator on a display of the MCU, such as the estimated number of carts being retrieved (as determined using the cluster analysis methods described below). If the retriever-mounted access point detects a misuse condition (e.g., a skid event or too many carts being pushed), it may disable the retriever 40 in various ways, such as by "spoofing" a manual throttle interface, or if the retriever 40 contains a motor controller with a digital external control interface, by issuing a stop command via this interface.

In the particular example shown in FIG. 1, the store includes a pair of conventional EAS (Electronic Article Surveillance) towers at the store exit, and also at the end of each checkout lane. Although EAS towers are not needed to implement the various functions described herein, the system may take advantage of their common presence in retail stores. For example, each cart transceiver (CT) may include an EAS receiver (see FIG. 4) for detecting that it is passing between a pair of EAS towers, and may be configured to report EAS detection events on the wireless tracking network; this information may in turn be taken into consideration in assessing whether an exiting customer has paid.

The example store configuration in FIG. 1 is also shown as having a VLF signal line 44 embedded in the pavement along an outer perimeter of the parking lot. Such signal lines are commonly used in prior art systems to define the outer boundary of the area in which shopping carts are permitted. In such prior art systems, the wheel 32 of each shopping cart includes a VLF receiver that detects the VLF signal, and engages the brake, when the cart is pushed over the signal line 44. Although not shown in FIG. 1, a VLF line may also be provided at the store exit such that all carts that pass through the exit have to cross over this line, and/or at other locations of interest.

While the present system does not require the use of a VLF signal line 44, the system is preferably capable of using one or more VLF lines as a mechanism for monitoring cart location. Specifically, cart transceiver (CT) preferably includes a VLF receiver. The VLF receiver may be capable of detecting a code transmitted on a VLF line, so that different lines can be used to uniquely identify different areas or boundaries. When the VLF signal is detected, the cart transceiver may take various actions, depending on the circumstances. For example, the cart transceiver may attempt to report the VLF detection event on the wireless tracking network and then wait for a command indicating whether to engage the brake. If no command is received within a pre-programmed time period in this example (e.g., 2 seconds), the cart transceiver may automatically engage the brake.

With further reference to FIG. 1, one or more magnetic markers or strips (MAG) may optionally be provided on or under the store flooring to provide an additional or alternative location-tracking mechanism. As illustrated, these magnetic markers may be provided in strategic locations, such as in each checkout lane and at the store exit. Although not shown in FIG. 1, one or more magnetic markers may also be provided in the parking log and/or in shopping aisles. Each magnetic strip has a unique magnetic pattern that can be sensed by an optional magnetic sensor included in each wheel 32. The magnetic markers thus serve as magnetic bar codes that identify specific locations. When a cart 30 crosses a magnetic marker in one embodiment, the cart transceiver (CT) transmits the detected magnetic code, or information from which this code can be derived, on the wireless tracking network. Additional details of how magnetic markers may be sensed and used are described below, and are also described in the Navigation Patent Application referenced above, the disclosure of which is incorporated by reference herein.

As will be apparent from the foregoing discussion, many of the components shown in FIG. 1 are optional components that may or may not be included in a given system installation. For instance, the magnetic markers, the EAS towers, and/or the VLF signal line can be omitted. In addition, either the access points or the CCU can be omitted. Further, the illustrated components may be arranged differently than illustrated. For instance, VLF signal lines could be provided in the checkout lanes and/or in the store exit/entrance (e.g., in place of the magnetic markers and EAS towers shown) to enable the carts to detect checkout events and exit/entrance events, respectively. Further, other types of signal transmitters and detectors/receivers could be used to monitor cart locations.

Figure 3:
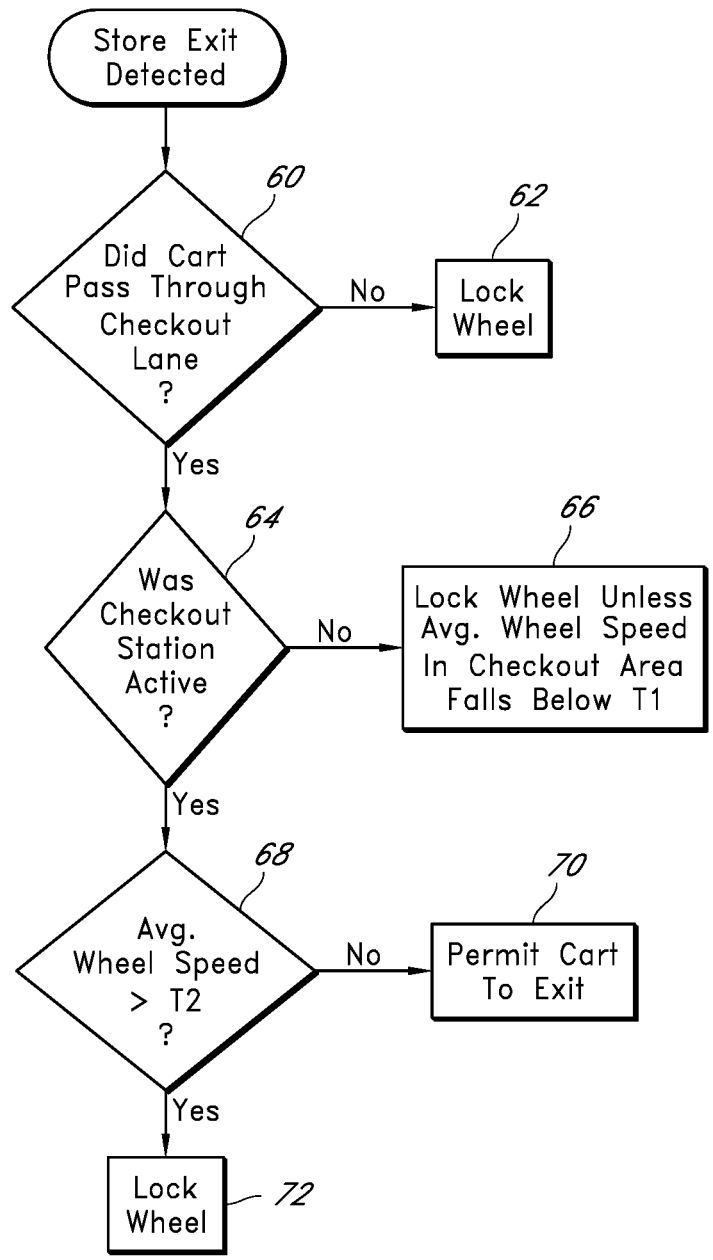
FIG. 3 illustrates one example of the decision logic that may be used to evaluate whether an exiting customer has paid.

II. Detecting Unauthorized Exit Events (FIGS. 2 and 3)

The system supports a variety of different methods for assessing whether a customer is exiting the store without paying. The particular method or methods used may vary widely based on the types and the locations of the system components included in a given installation. For example, if the store does not include any Electronic Article Surveillance (EAS) Towers, magnetic markers (MAG), or VLF lines, the determination may be made based solely or primarily on cart location/path information determined from CT-AP communications, with wheel speed history optionally taken into consideration as an additional factor. If EAS towers, magnetic markers, and/or VLF signal lines are provided, they may be used as additional or alternative sources of information from which the decision can be made.

FIG. 2 illustrates three representative checkout stations 34, and will be used to describe how access point "zones" may optionally be used to monitor cart locations and to assess whether an exiting customer has paid. Each checkout station 34 in this example includes a respective access point (AP) with a directional antenna (not shown), as described above. The directional antennas are oriented such that each access point creates a respective zone 46 extending outward from the cart entry area of the checkout lane. Each zone 46 in the preferred embodiment represents the area in which the RSSI of the respective access point's transmissions, as measured by the cart transceivers, exceed a selected threshold. The transmission ranges of the access points typically extend well beyond their respective zones. The zones 46 in this example are positioned such that a cart that enters the corresponding checkout lane will ordinarily pass through the corresponding zone. Some overlap may occur between adjacent zones, as shown in this example.

In the example shown in FIG. 2, access points (APs) positioned near the store exit/entrance create two additional zones 48 that may be used to detect cart exit and entry events. Access points in other areas (not shown) may create additional zones used for other purposes. The store exit/entrance in the illustrated configuration of FIG. 2 also includes a VLF signal line 49. The code transmitted on this line 49 may uniquely correspond to the store's exit/entrance. In this configuration, cart exit events can be distinguished from cart entry events by evaluating the timing with which the cart transceiver detects this VLF code relative to the timing which it sees various RSSI levels from the exit-mounted access points. For instance, if the strengths of transmissions from the exit-mounted access points peak and then fade before the wheel detects the VLF signal, the cart is likely exiting the store.

In one embodiment, when a shopping cart 30 (i.e., its cart transceiver) detects that it has entered into a zone 46, 48 (as determined by monitoring the RSSI values of the corresponding access point's transmissions), it registers with the access point (AP) by responding to a periodic transmission from the access point. If this access point is located at a checkout station 34, the access point may instruct the cart transceiver to enter into a data collection mode in which it monitors and reports a wider range of events and conditions than usual. For example, if the cart transceiver includes an EAS receiver, it may power-up this receiver for purposes of detecting passage between a pair of EAS towers. In addition, if the wheel 32 includes a rotation sensor, the cart transceiver may monitor the wheel's rotation, such as by counting the number of rotation interrupts that occur. The cart transceiver may also periodically generate and store RSSI values for the access point transmissions it hears.

Upon passage through a set of EAS towers (if used) or entry into an exit zone 48, the cart transceiver may send the collected data (wheel speed history, RSSI values, magnetic marker or EAS detection events, etc.) to an access point for analysis to determine whether a payment event has occurred. The active/inactive state of the checkout register/station 34 corresponding to the cart's path may also be considered.

The task of evaluating the collected data is preferably handled primarily by the access points and/or the CCU, but could alternatively be handled partially or wholly by the cart transceivers (CTs). Data collected by two or more different access points, potentially including access points that are not near the checkout stations 34, may be analyzed in combination for purposes of assessing whether a payment event occurred. For example, as a cart moves from one zone to another, it may communicate with a number of different access points. The history of these communications may be aggregated (e.g., by the CCU) and analyzed to estimate the cart's navigation path over time, and this estimated path may in turn be considered in assessing whether the customer has paid.

In some configurations, checkout activity may be monitored without providing access points (APs) at the checkout stations 34. In these configurations, the system may detect that a cart has passed or is passing through a checkout lane based on one or more of the following: (1) detection by the wheel 32 of a magnetic marker that uniquely identifies a particular checkout lane; (2) if the store has VLF signal lines/transmitters or EAS towers in the checkout lanes, detection by the cart transceiver (CT) of a VLF or EAS signal, optionally in conjunction with location history information indicating that the cart is in the general vicinity of a checkout lane.

FIG. 3 illustrates one example of the decision logic that may be used to determine whether to enable a cart 30 to exit the store. This logic may be embodied in software executed by the CCU, an access point, and/or a cart transceiver, and may be executed upon detecting that a cart is attempting to exit the store. This logic uses data acquired via two-way communications with the cart to infer whether the cart is being used to steal merchandise (referred to as an "inferred theft" or "pushout" event).

As depicted by blocks 60 and 62, if it is determined that the cart did not recently pass through a checkout lane, the wheel 32 is caused to lock. Otherwise, a determination is made whether the checkout station 34 detected as being used by the cart was in an active state at the time (block 64). This determination may be made in a variety of ways. For example, in some stores, the CCU may be able to get this information substantially in real time from a centralized store computer system that connects to the individual POS registers. Thus, for example, if magnetic markers (MAG) are provided in the checkout lanes, the wheel 32 may sense the unique magnetic code of its checkout lane and relay this information to the CCU via an access point; the CCU may then query the central store computer system to determine the state of the register. The active/inactive determination may alternatively be made by an access point (AP) mounted at the checkout station; for example, the access point may include or be locally connected to an acoustic sensor that senses the beep sound produced by the merchandise scanners, or may include a light-based sensor or pressure-sensitive floor mat that detects whether a cashier is present at the station.

If the checkout station 34 was inactive in the example shown in FIG. 3, the wheel is caused to lock unless the average wheel speed through the checkout area is sufficiently low to indicate a likely payment event (block 66). If the checkout station was active, the cart is permitted to exit unless, in some embodiments, the average wheel speed is sufficiently high to indicate that the customer did not stop to pay (blocks 68-72).

As will be apparent, the decision logic shown in FIG. 3 can be varied in a number of ways. For example, the determination of whether to permit the cart to exit can be made without regard to the identity of the checkout lane used; for instance, the cart may be authorized to exit as long as it passed through some checkout lane with an average wheel speed falling below a selected threshold. As another example, the determination whether to authorize the exit may be made without regard to wheel speed; for instance, the exit event may be authorized as long as the cart passed through a checkout lane that was active. Other criteria that may be considered include the following: (1) the total amount of time the cart spent in the store since its last entry, (2) whether the cart passed through an area that includes high priced and/or frequently stolen merchandise, as determined, e.g., based on whether the cart communicated with (or exceeded a specific threshold RSSI with) a particular access point (AP) or sensed a particular magnetic marker (MAG) or VLF code.

Further, in addition or as an alternative to locking the wheel 32 as shown in FIG. 3, some other action may be taken in response to the inferred theft event. Examples include activating a visual and/or audio alarm, and generating a capture event to a digital video recorder.

III. Cart Transceiver and Wheel Electronics (FIGS. 4 and 5)

Figure 4:
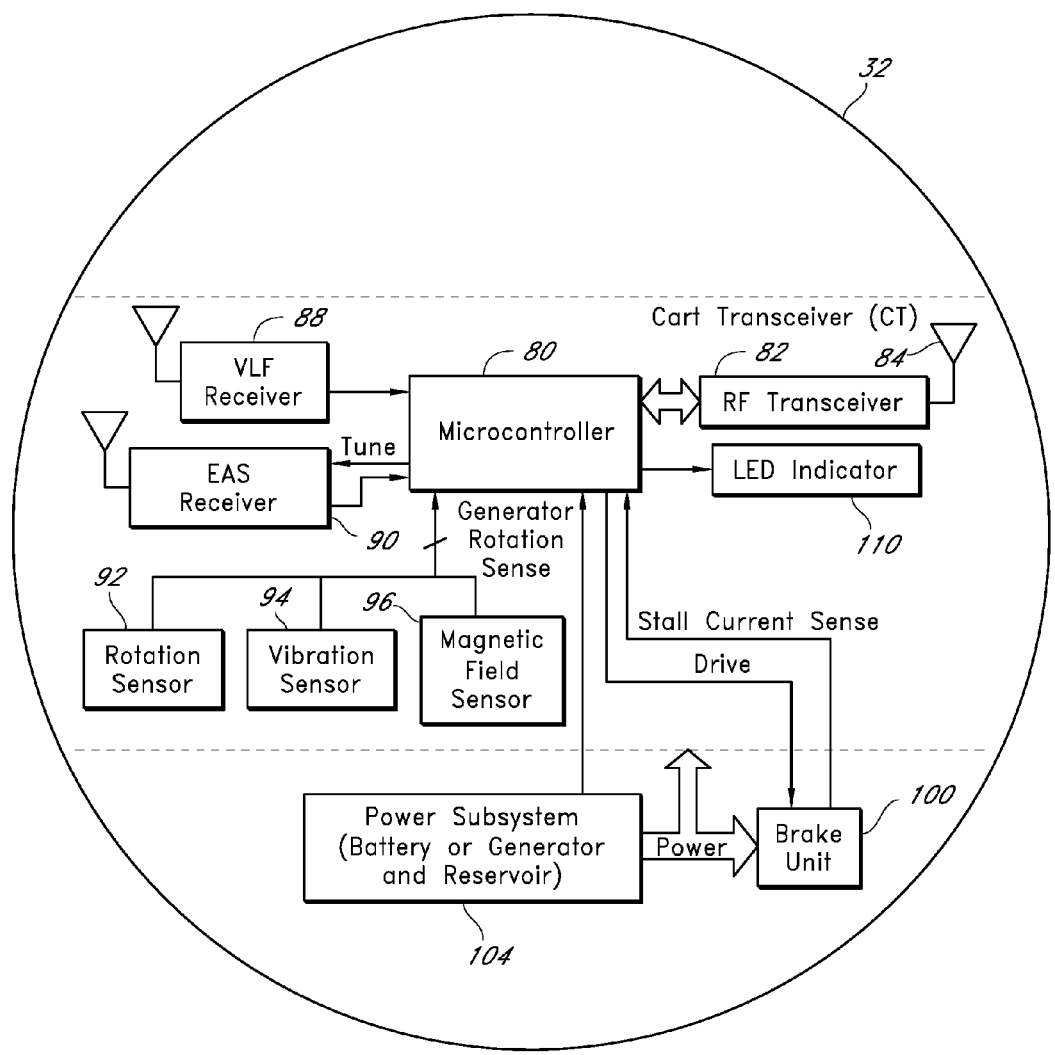
FIG. 4 illustrates the electronics that may be included in a shopping cart wheel according to one embodiment of the invention.
Figure 5:
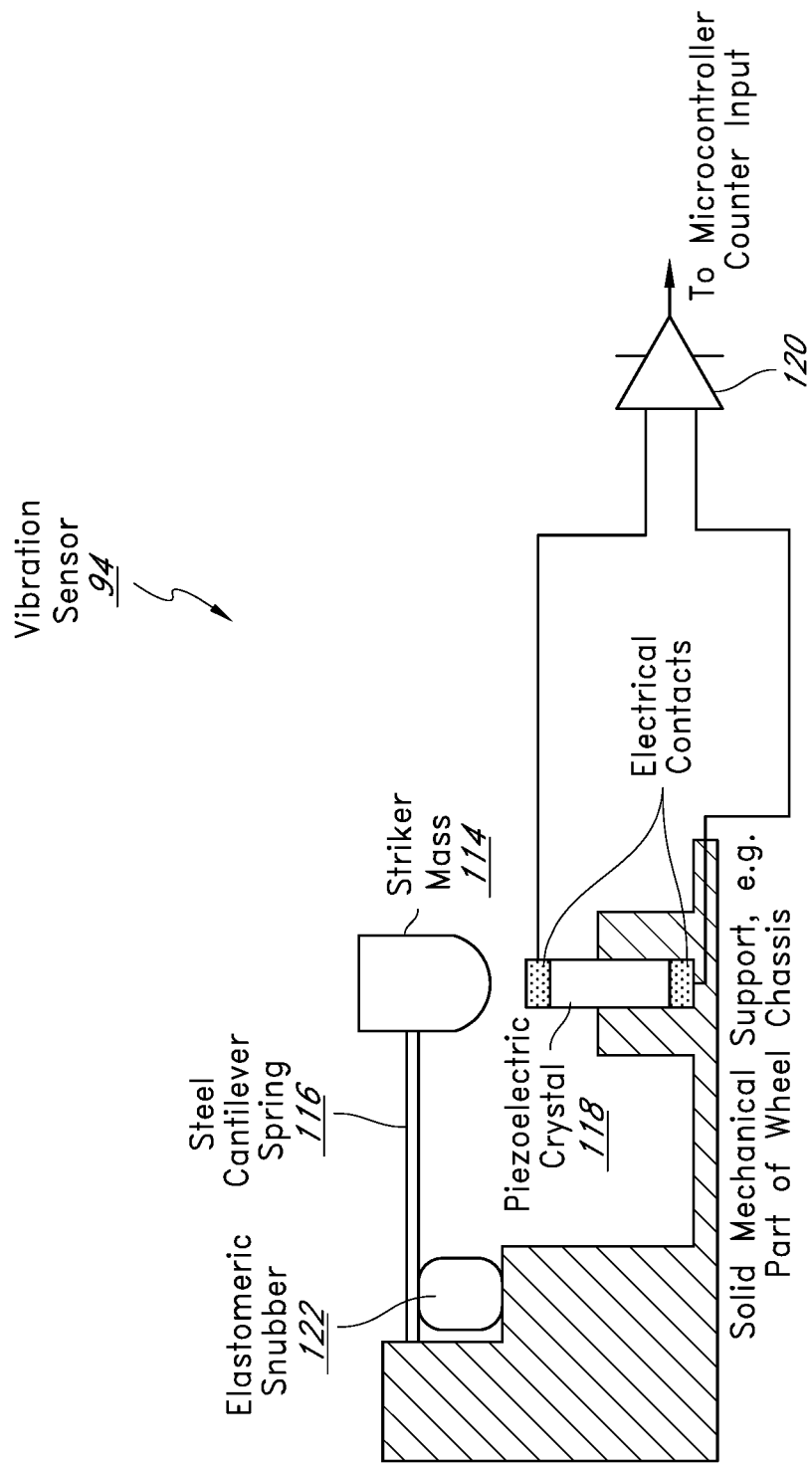
FIG. 5 illustrates one example of a type of vibration sensor that may be included in the wheel to detect skid events.

FIG. 4 illustrates some of the different types of components that may be provided in or in conjunction with the cart transceiver (CT) according to one embodiment of the invention. In this embodiment, all of the components shown in FIG. 4 are mounted inside the shopping cart wheel 32. As discussed below, some of the components shown in FIG. 4 may alternatively be provided elsewhere on the cart 20, such as in a display unit mounted to the shopping cart, or in another portion of the wheel assembly (e.g., in the caster). The design illustrated in FIG. 4 and described below can be varied widely without departing from the scope of the invention.

As illustrated in FIG. 4, the cart transceiver (CT) includes a microcontroller 80 that communicates with an RF transceiver 82. The microcontroller is preferably a low power device that includes a self-programmable flash memory, RAM, and a set of integrated peripheral circuits such as an Analog to Digital Converter (ADC) and a multichannel Counter/Timer Circuit (CTC). An Atmel ATMegal 68V-10MI is one example of a microcontroller that is suitable for use. The microcontroller 80 and RF transceiver 82 collectively act as a programmable RF transceiver system. The RF transceiver system may alternatively be implemented without the use of a separate microcontroller; for example, an IC device that includes both an RF transceiver and a processor, such as a TI/Chipcon cc2510, may be used. As another example, the microcontroller 80 could be replaced with another type of controller device, such as a custom ASIC (Application Specific Integrated Circuit).

The RF transceiver 82 is preferably either a 2.4 GHz or 5.7-5.8 GHz transceiver, although other frequency bands such as UHF can be used. The RF transceiver 82 preferably has the following attributes: (1) very low power for periodic wakeup and receive, (2) modulation that is insensitive to phase reversal (e.g., Frequency Shift Keying or FSK), (3) log linear RSSI measurement, (4) hardware support for Clear Channel Assessment (CCA). One example of an RF transceiver that may be used is a TI/Chipcon cc2500. One useful feature of this RF transceiver device is that it is capable of receiving transmissions while the microcontroller 80 is in an inactive state, and waking up the microcontroller if the received transmission matches pre-programmed criteria. The RF transceiver 82 is coupled to an antenna 84, which preferably has a differential ended antenna port so that no balun is needed when using a preferred differential antenna 84.

As illustrated in FIG. 4, the cart transceiver (CT) also optionally includes a VLF receiver 88 for detecting VLF signal lines 44. The VLF receiver 88 may, for example, be an 8 kHz receiver that is compatible with existing shopping cart containment systems, and which is capable of detecting a code transmitted via a VLF line. The cart transceiver also includes an optional Electronic Article Surveillance (EAS) receiver 90 for detecting EAS tower interrogations as described above. To conserve power, the microcontroller 82 preferably maintains the EAS receiver 90 in an inactive state except when certain types of events are detected, such as events evidencing a possible checkout or store exit event. The EAS receiver 90 is preferably tunable by the microcontroller 80 to the various frequencies commonly used for EAS.

As shown in FIG. 4, the microcontroller 80 is connected to a rotation sensor 92, a vibration sensor 94, and a magnetic sensor 96. One or more of these sensors may alternatively be omitted. The rotation sensor 92 enables the microcontroller 80 to detect wheel rotation events, and may be implemented using mechanical, optical, and/or electromagnetic components. By measuring the number of rotations that occur over a period of time, the microcontroller 80, and/or an access point or the CCU, can determine the wheel's average rotation speed and the cart's average speed.

The vibration sensor 94, if present, enables the microcontroller 80 to detect wheel vibration/skid events commonly caused when a motorized shopping cart retriever 40 pushes or pulls a cart whose wheel is locked or has an improper orientation. One example of a vibration sensor design that may be used is shown in FIG. 5 and is discussed below. Upon detecting a skid event, the cart transceiver may transmit an alert message to a nearby access point, which in some cases may be an access point mounted to a motorized cart retriever 40. The retriever-mounted access point may respond to such an alert message by generating a signal that disables the cart retriever 40 and/or causes an alarm on the cart retriever 40 to be activated. This feature of the invention may, in some embodiments, be implemented without two-way communications with the carts; for example, the wheel's RF transceiver 82 could be replaced with an RF transmitter, such that the wheel 32 transmits skid alert messages but does not received any data.

The magnetic field sensor 96, if present, enables the microcontroller 80 to detect magnetic markers (MAG) of the type described above. The magnetic sensor 96 may, for example, be one of the following: (1) a two-axis magnetic sensor capable of measuring the value of the two magnetic field components in an object's plane of motion; (2) a "2½ axis" sensor that can measure two magnetic field components and the algebraic sign of a third component, or (3) a three-axis magnetic field sensor that measures each of the three independent magnetic field components. When the magnetic field sensor 96 initially detects a likely magnetic marker in one embodiment, the microcontroller begins buffering the output of the magnetic field sensor, and continues such buffering until the microcontroller determines that the wheel 32 has likely finished passing over the marker. The cart transceiver (CT) then transmits the buffered data to an access point (AP) for analysis together with wheel rotation-sensor data. The access point or the CCU then analyzes this data to determine whether a magnetic marker was actually crossed, and if so, to identify the unique code of this marker. This analysis could alternatively be performed by the cart transceiver (CT), and the result transmitted to an access point.

One additional type of sensor that may be included in the wheel 32 is a heading sensor (not shown in FIG. 4) that senses the orientation of the wheel 32, and thus the direction of travel of the cart 30. If a heading sensor is provided, data collected by the rotation and heading sensors may be used in combination by the cart transceiver, an access point, or the CCU to calculate the cart's location relative to one or more known reference points. Examples of algorithms that may be used for this purpose are described in the Navigation Patent Application referenced above.

Various other types of sensors and receivers may additionally or alternatively be included in the wheel 32 or wheel assembly. For example, in some applications, it may be feasible to include a GPS (Global Positioning System) receiver in the wheel or wheel assembly, or to include another type of electronic device that is capable of calculating its position based on received RF, optical, or ultrasonic signals. Further, the wheel 32 could transmit a signal that is used by an external node or system to detect the wheel's location, and the wheel could then be notified of its location via an access point.

As illustrated in FIG. 4, the microcontroller 80 generates a drive signal that controls the state of the wheel's braking unit 100, such as by driving a brake motor, to change the locked/unlocked state of the wheel. Decisions to lock the brake may be made by the microcontroller 80, an access point (AP), and/or the CCU, depending upon the system's configuration and the scenario involved. For example, the microcontroller 80 may be programmed to automatically lock the wheel, in the absence of a command to the contrary, whenever a VLF or EAS signal is detected. As another example, lock decisions that are not responsive to detection of a VLF or EAS signal may be made by an access point or the CCU. As mentioned above, in some embodiments a braking unit 100 that supports partial braking may be used; in such embodiments, the microcontroller may gradually engage the brake whenever a lock decision is made so that the cart does not stop suddenly.

As illustrated in FIG. 4, the cart transceiver (CT) and the brake unit 100 are powered by a power subsystem 104. The power subsystem 104 preferably includes either a battery, or a power generator that generates a power signal from the rotation of the wheel 32. If a power generator is used, the power signal is preferably provided to a capacitor, or other energy reservoir, so that power continues to be supplied to the wheel's active components when the wheel is stopped. Examples of power generator designs that may be used in the wheel 32 are described in the Power Generation Patent Application referenced above, the disclosure of which is incorporated by reference herein.

In some embodiments of the invention, the brake unit 100 may be omitted from the wheels 32. In these embodiments, the system may track and report the locations and statuses of the carts 30 or other vehicles without attempting to stop their movement.

FIG. 4 also depicts an optional LED indicator 110 that may be provided on a visible portion of the wheel 32 or wheel assembly. This LED indicator may be strobed by the microcontroller 80 to visually indicate that the cart 30 is in a particular state. For example, if the wheel is currently locked, and a particular type of command is received from the mobile control unit (MCU), the microcontroller may strobe the LED at a low duty cycle for several seconds; this feature may be used to enable store personnel to efficiently identify carts whose wheels are locked. Alternatively, the indicator may be electromechanical, e.g. a highly visible feature, such as a bright orange piece of a suitable material, may be made visible and invisible via an electromechanical device controlled by the microcontroller 80.

FIG. 5 illustrates one example of a vibration sensor 94 that may be used in the wheel 32. The vibration sensor 94 includes a striker mass 114 attached at the end of a cantilever spring 116. When vibration of a sufficient amplitude occurs along the vertical axis, the striker mass 114 strikes a piezoelectric crystal 118, causing the piezoelectric crystal to generate a voltage. The output signal is optionally buffered by an opamp 120 before being fed to a counter input of the microcontroller 80. The microcontroller counts the number of pulses generated by the vibration sensor per unit time to evaluate whether the vibration matches the skid profile of a wheel 32, and generates a skid alert message on the wireless tracking network if it does. The frequency response of the vibration sensor 94 may be tuned by varying the characteristics of the striker mass 114, spring 116, and an elastometric snubber 122.

Various other types of vibration sensors can alternatively be used. For example, a disturbance switch, such as a 10651-X-000 disturbance switch from Aerodyne Controls, may be used.

The rotation sensor, if included, may be similar to the vibration detector shown in FIG. 5, but with the free striker mass 114 replaced with one or more bumps molded inside the wheel. These bumps are arranged to push a striker against the piezoelectric crystal during wheel rotations. The bumps may be spaced unevenly so that forward rotation can be distinguished from reverse rotation. Various other types of rotation sensors, including those that use magnets such as Hall Effect sensors, may alternatively be used.

IV. Wheel Configuration and Antenna Radiation Pattern (FIGS. 6-8)

Figure 6:
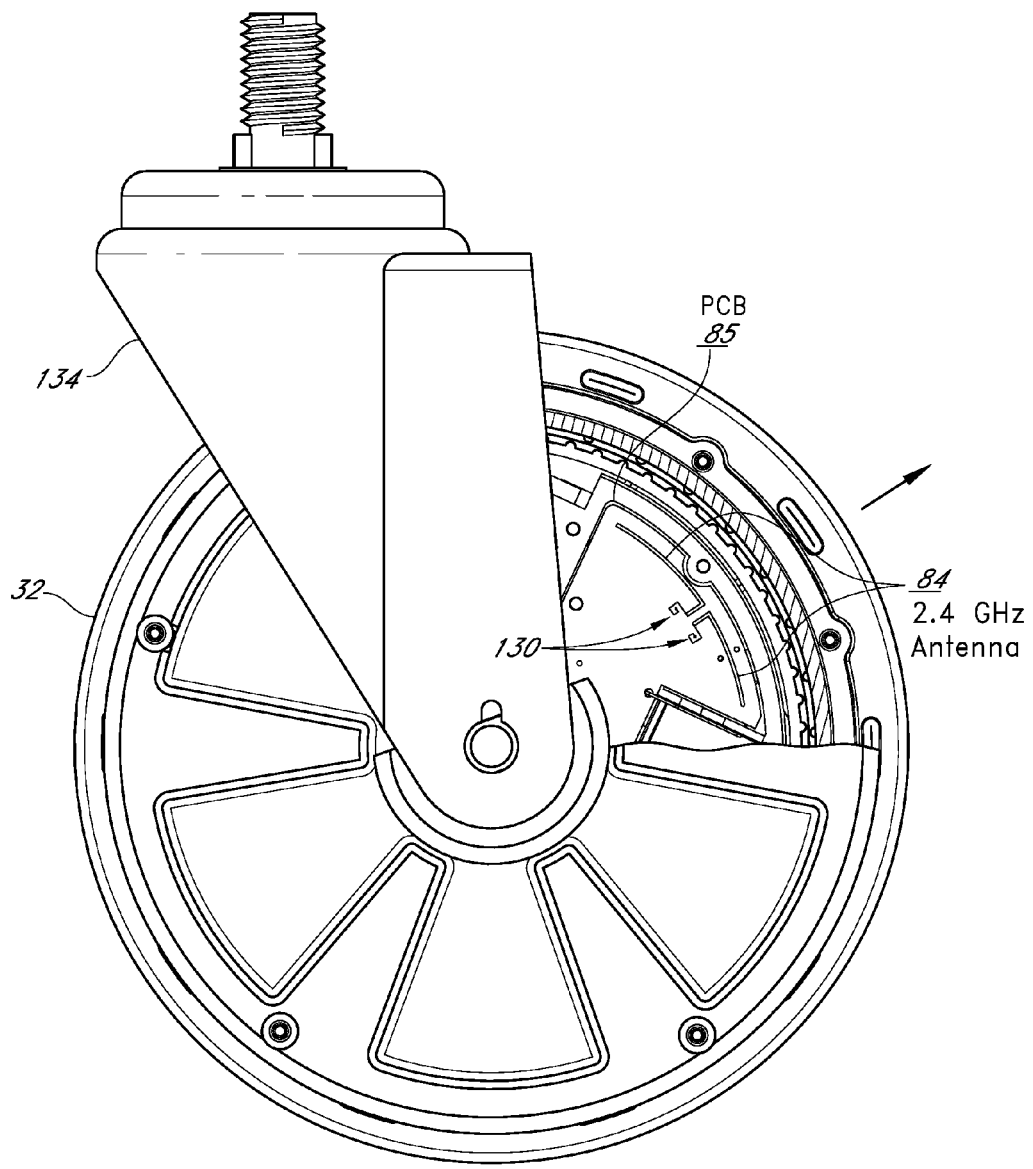
FIG. 6 illustrates how an antenna used for two-way communications may be configured and positioned within a shopping cart wheel in a 2.4 GHz implementation.

FIG. 6 is a breakaway view of a wheel 32 attached to a metal caster 134 (also commonly referred to as a "fork"). The wheel 32 and caster 134 collectively form a wheel assembly that is adapted to be attached (screwed in) to a shopping cart in place of a standard-size shopping cart wheel assembly. The drawing illustrates how the RF transceiver's antenna 84 may be configured and positioned in the wheel 32 in a 2.4 GHz implementation. Ideally, a straight antenna with a length of 1.6 inches would be used for 2.4 GHz implementations. Because such an antenna does not easily fit is a suitable location in a standard 5" wheel, a shorter antenna is used, with the antenna curved to match the curvature of the inner surface of the wheel's rotating portion. Different antenna configurations would typically be used for designs that use other frequency bands, such as UHF or 5.7-5.8 GHz.

The antenna 84 is preferably formed on a printed circuit board 85 that remains stationary as the wheel rotates. This same printed circuit board also includes the various electronic components shown in FIG. 4. To compensate for its shorter than ideal length, the antenna 84 is coupled to a pair of spiral inductors 130, each of which has an inductance of about 1.25 nanohenries. Each such inductor 130 is preferably connected via a respective 1.3 pF capacitor (not shown) to a differential output of the RF transceiver 82. The arrow in FIG. 6 illustrates the direction of the strongest antenna radiation, which is preferably somewhat upward since the access point antennas typically reside at a higher elevation than the wheels 32.

Figure 7:
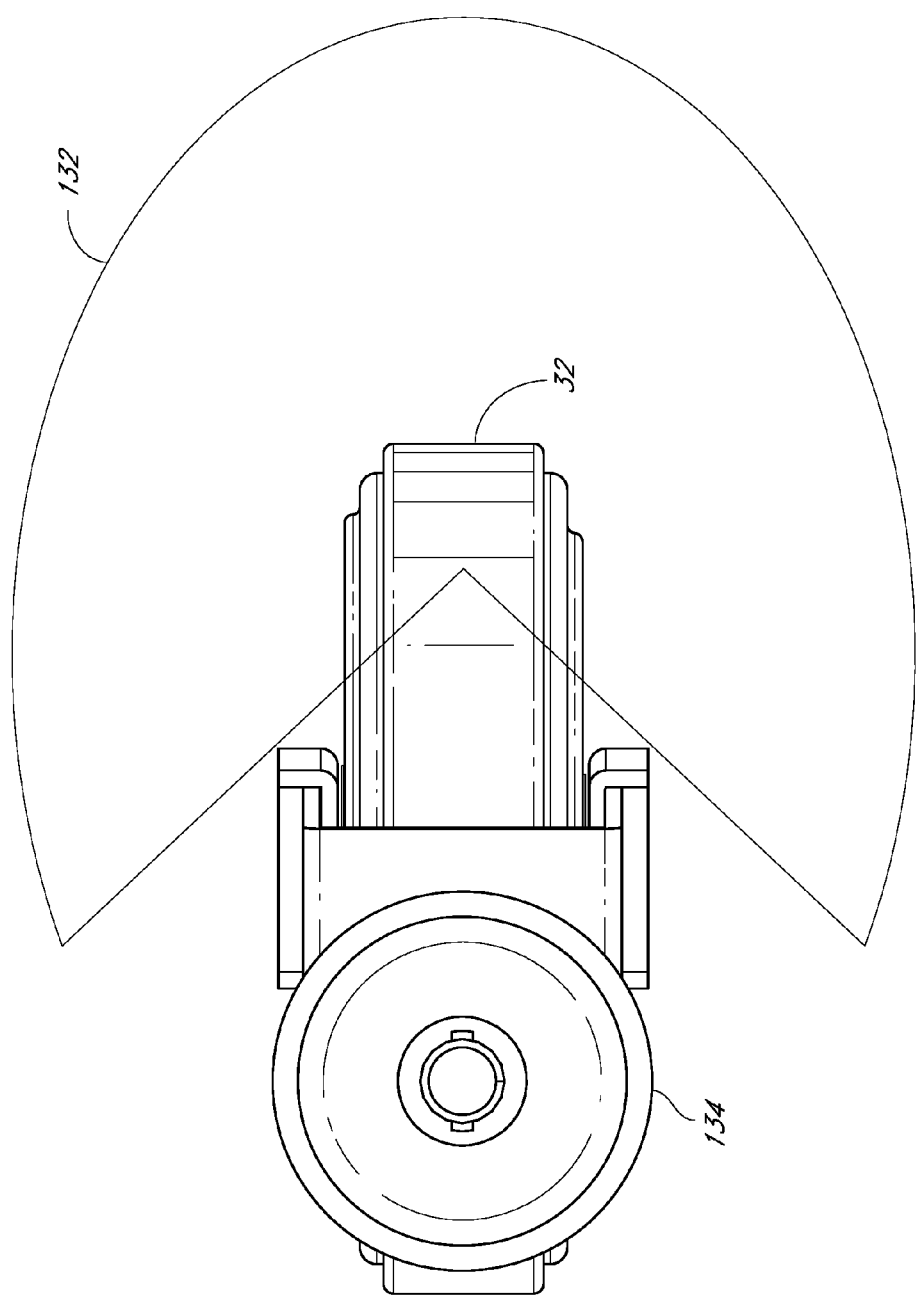
FIG. 7 is a top view illustrating the unoccluded radiation pattern produced by the antenna of FIG. 6.
Figure 8:
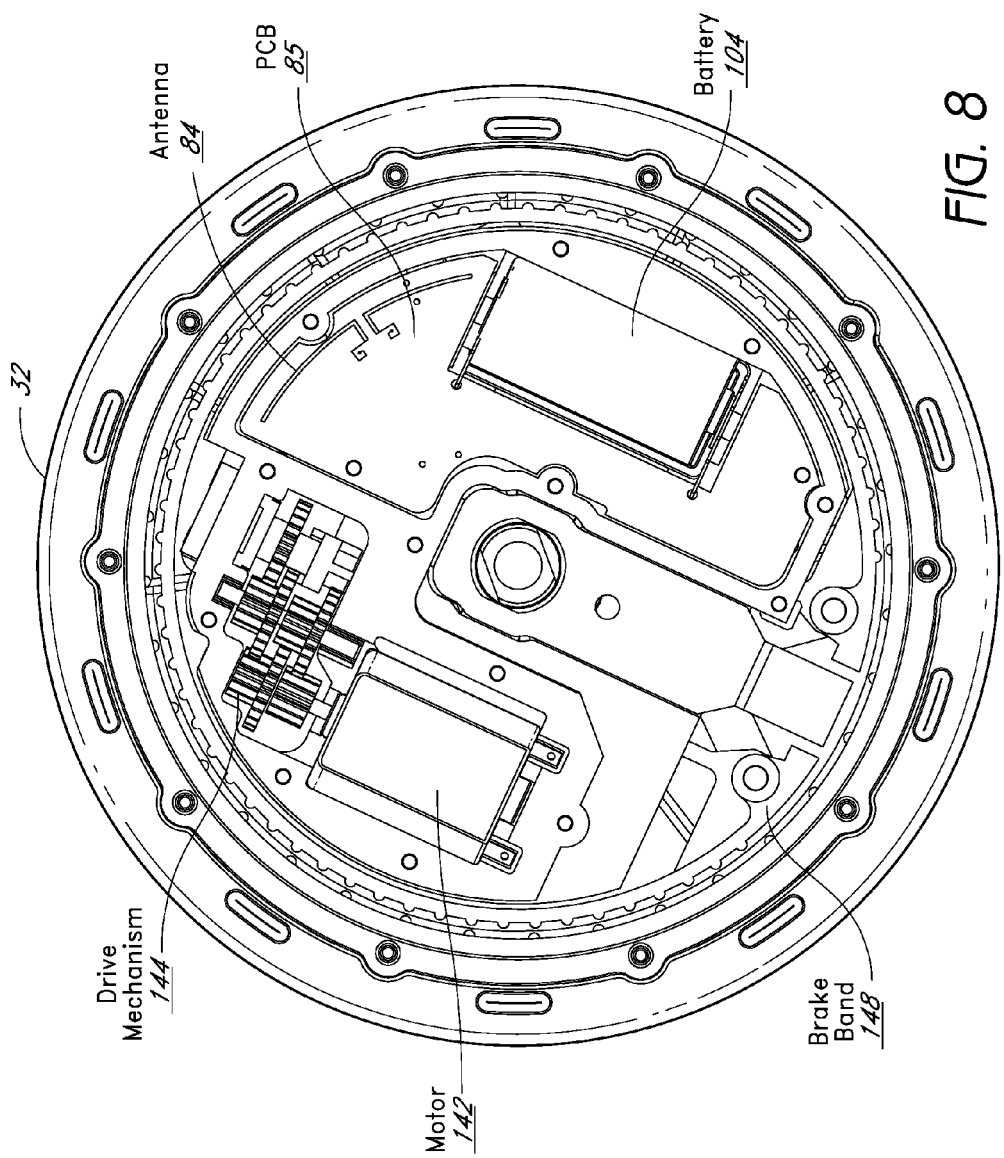
FIG. 8 illustrates how other electrical and mechanical components may be arranged within the wheel according to one embodiment.

As illustrated in FIG. 7, the antenna configuration shown in FIG. 6 produces an unoccluded radiation pattern 132 that extends horizontally outward from the back and sides of the wheel. Signal transmissions in the direction of wheel movement tend to be attenuated to a much greater degree as the result of the metal caster 134. In some embodiments the caster may be non-conducting, in which case the attenuation of the signal in the forward direction is much less severe.

FIG. 8 is another view illustrating how various other components may be arranged inside the wheel 32. In this example, the wheel is powered by a battery 104, although the battery may be replaced with a power generator as described above. The other illustrated components include the printed circuit board 85; a brake motor 142 that drives a drive mechanism 144 (set of gears) to control the locked/unlock state of the wheel 32; and a drive band 148 that expands and contracts under control of the motor to come into and out of contact with the rotating portion of the wheel 32. All of the internal components mentioned above are fully contained and enclosed within the wheel (behind a cover plate that is not shown in FIG. 8) such that they cannot be seen by the user of the shopping cart, and cannot easily be tampered with.

In other embodiments, some or all of the electronic and braking components may reside outside the wheel 32, such as in an enclosed plastic housing that forms part of the caster.

V. Embodiment with RF Transceiver Circuitry in Display Unit (FIG. 9)

Figure 9:
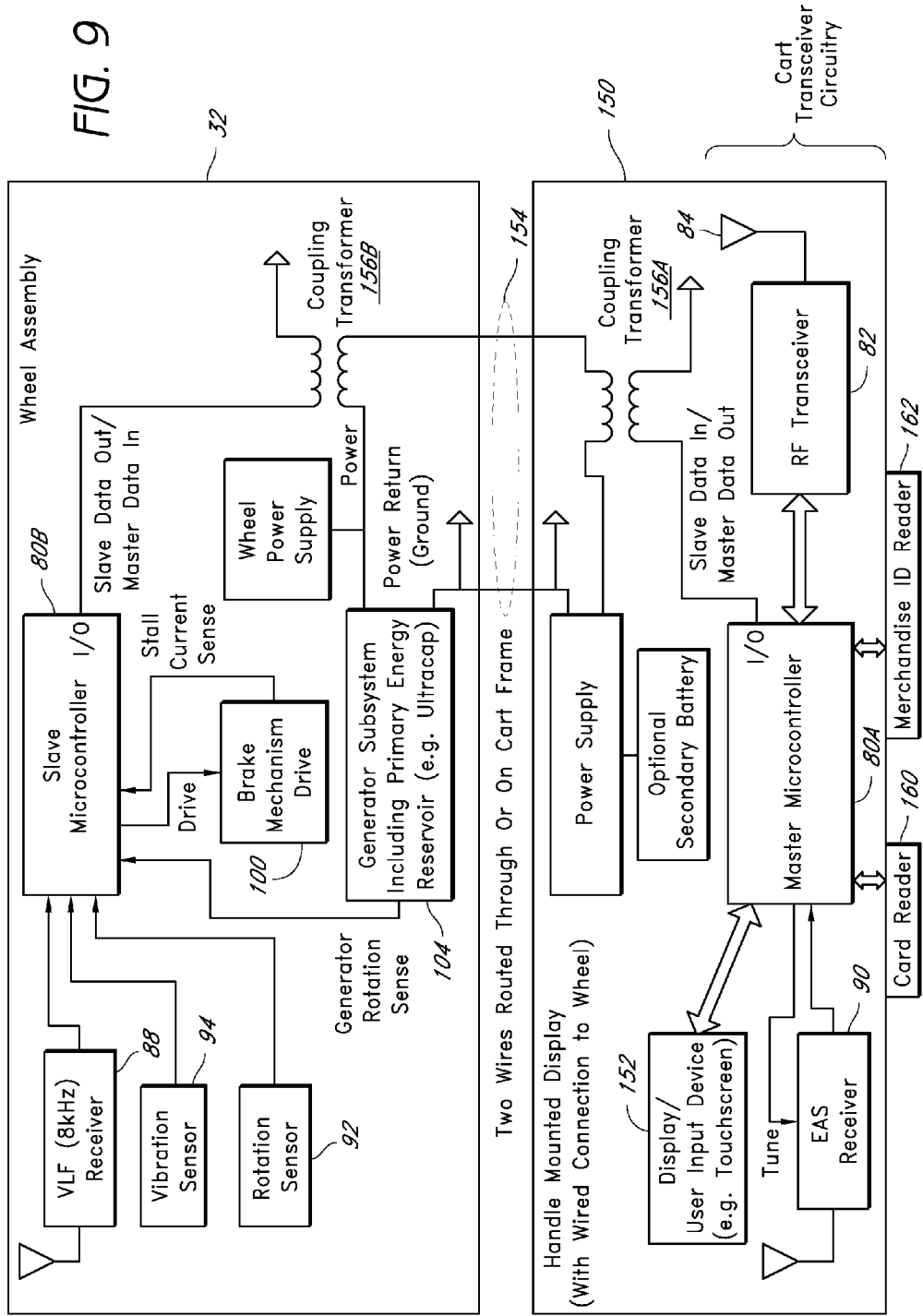
FIG. 9 illustrates an embodiment in which the cart includes a handle-mounted display unit that includes the RF transceiver circuitry used for two-way communications.

FIG. 9 illustrates an embodiment in which some of the cart transceiver (CT) circuitry is included in a handle-mounted display unit 150, rather than the wheel 32. The handle mounted display unit 150 includes a display screen 152, such as a touch screen, that is viewable by the customer while pushing the shopping cart 30. The display screen 152 is connected to a master microcontroller 80A, which is connected to an RF transceiver 82. The master microcontroller 80A and the RF transceiver 82 may be the same as the microcontroller 80 and RF transceiver 82 used in the embodiment of FIG. 4. The wheel 32 includes a slave microcontroller 80B, which may be a more basic (lower functionality) device than the master microcontroller 80A. The wheel 32 also includes a power generator subsystem 104 that includes a power generator and reservoir.

The wheel electronics and the display unit 150 are connected by a pair of wires 154, which may be routed through or on the shopping cart's frame. These wires are used to supply power from the wheel's power generator subsystem 104 to the display unit 150, and are also used for two-way communications between the two microcontrollers 80A, 80B. The display unit 150 may also include a battery for enabling the display unit to continue to operate when the wheel's power reservoir is deeply discharged. The two-wire connection is made via a pair of coupling transformers 156A, 156B. One example of a mechanical coupling that may be used to pass the transformer coupled signals from the wheel's PCB to the cart frame and thence to the display unit 150 is described in the Power Generation Patent Application referenced above.

The two microcontrollers 80A, 80B communicate in half duplex mode using a one-wire protocol. A variety of suitable one-wire protocols are known in the art. One example is the protocol defined by the ISO 11898-1 Controller Area Network (CAN) specification. To transmit data from the display unit 150 to the wheel 32, the master microcontroller 80A sets the I/O port that is connected to the coupling transformer 156A to "output," and the slave microcontroller 80B sets its I/O port to "input." The master microcontroller then toggles its I/O port output on and off at one of two frequencies to generate an FSK signal. The AC component of that signal couples onto the power line through the coupling transformer 156A and passes through the other coupling transformer 156B. The slave microcontroller 80B can distinguish between the two FSK frequencies by counting the number of crossings per unit time. Transmissions in the opposite direction occur in the same manner. The two microcontrollers 80A and 80B may be programmed such that some or all of the events detected via the VLF receiver 88, vibration sensor 94, and rotation sensor 92 (and/or other sensors included in the wheel) are reported to the master microcontroller 80A so that they may, if appropriate, be reported to an access point.

The electrical coupling between the wheel 32 and the display unit 150 can be varied in a number of ways. For example, a third wire may be added to directly connect the two I/O ports, so that the two coupling transformers 156A, 156B can be omitted. As another example, the power generator may be omitted from the wheel 32, and the wheel electronics may be powered by a battery in the display unit. In yet another embodiment, the wired connection is omitted, and wheel 32 and the display unit 150 communicate with each other solely by RF and are powered by their own respective power sources.

In some implementations, the display unit 150 may have a card reader 160, such as a magnetic card reader or a barcode scanner, that enables a customer to swipe a customer loyalty card or another type of card that identifies the customer. In these implementations, the cart transceiver may be configured to convey the customer identifier to an access point such that this identifier can be associated with the other cart events detected during the customer's shopping session.

The display unit 150 may additionally or alternatively include or be connected to a merchandise ID reader 162, which may be a barcode scanner or RFID reader. In the case of an RFID reader, the CT may use cart movement data (e.g., as determined using a wheel rotation sensor) in combination with data from the RFID reader to identify products that are in the cart. For example, if the cart is has moved forward by a selected distance (e.g. 20 feet) and the RFID reader is still detecting the presence of a particular product, the product may be treated as being in the cart (as opposed, for example, to being on in a nearby cart or on a nearby shelf).

If a merchandise ID reader is provided and is used by the customer, the display unit 150 may, for example, display the names and prices of the items selected by the customer to purchase, and may convey this information to an access point (AP). The display unit may also display recommendations of related products. In some implementations, a single scanner or reader device such as a barcode scanner may serve as both a merchandise scanner 162 and a loyalty card reader 160. The display unit 150 may also include a beeper, chirper, or other audio signal generator (not shown) that outputs an audio signal when a new message is initially displayed, or when the customer's attention is otherwise desired.

VI. Access Point Design (FIG. 10)

Figure 10:
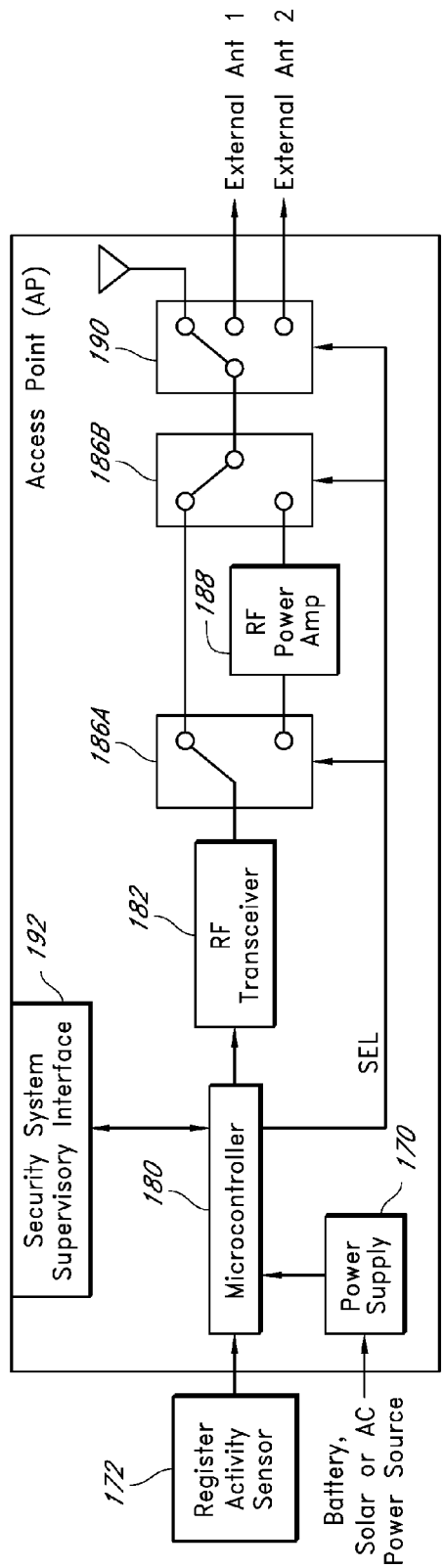
FIG. 10 is a block diagram of a circuit that may be used to implement the access points.

FIG. 10 shows the design of an access point (AP) according to one embodiment of the invention. The access point includes a power supply 170 that receives power from a power source. For indoor installations, an AC power source will typically be used, while for outdoor installations, a solar cell and/or a battery may be used for those outdoor locations where providing AC or DC power is infeasible. The access point optionally includes or is coupled to a register activity sensor 172 capable of sensing whether a checkout register is currently active. Such a sensor may be used, as described above, when the access point is mounted at a checkout station 34.

In one embodiment, the register activity sensor 172 is an acoustic sensor that is trained or trainable to detect the audible beep generated by conventional merchandise scanners. When this type of sensor is used, the access point (AP) treats the register as active when beep signals of sufficient amplitude and/or specific frequency content are being detected at regular intervals. Beep signals of adjacent registers/scanners can typically be filtered out and ignored based on their lower volume at the location of the access point. The acoustic register activity sensor may either be mounted inside the housing of the access point, or may be connected to the access point by a pair of small wires.

Various other types of register activity sensors 172 may alternatively be used. For example, an infrared or LED sensor, or a weight sensor positioned under a mat, may be used to detect whether a cashier is present at the register. As another example, the access point may passively monitor the register's wired interface (typically an RS-422 differential full duplex interface) to the store's point-of-sale central system, and may infer that the register is active when signals are detected that reflect common activity patterns. Further, in some installations, information about the active/inactive states of the registers/checkout stations may be obtained by querying a preexisting store computer that maintains such information, and thus without the use of a register activity sensor 172.

As illustrated in FIG. 10, the access point (AP) includes a microcontroller 180 and an RF transceiver 182, both of which may be the same as in the cart transceivers (CTs). A set of switches 186A and 186B enable the RF transceiver's output to be selectively amplified via an RF power amplifier 188. One example of a power amplifier that may be used is a Tyco M/A-COM MAAPS0066 device.

Figure 15:
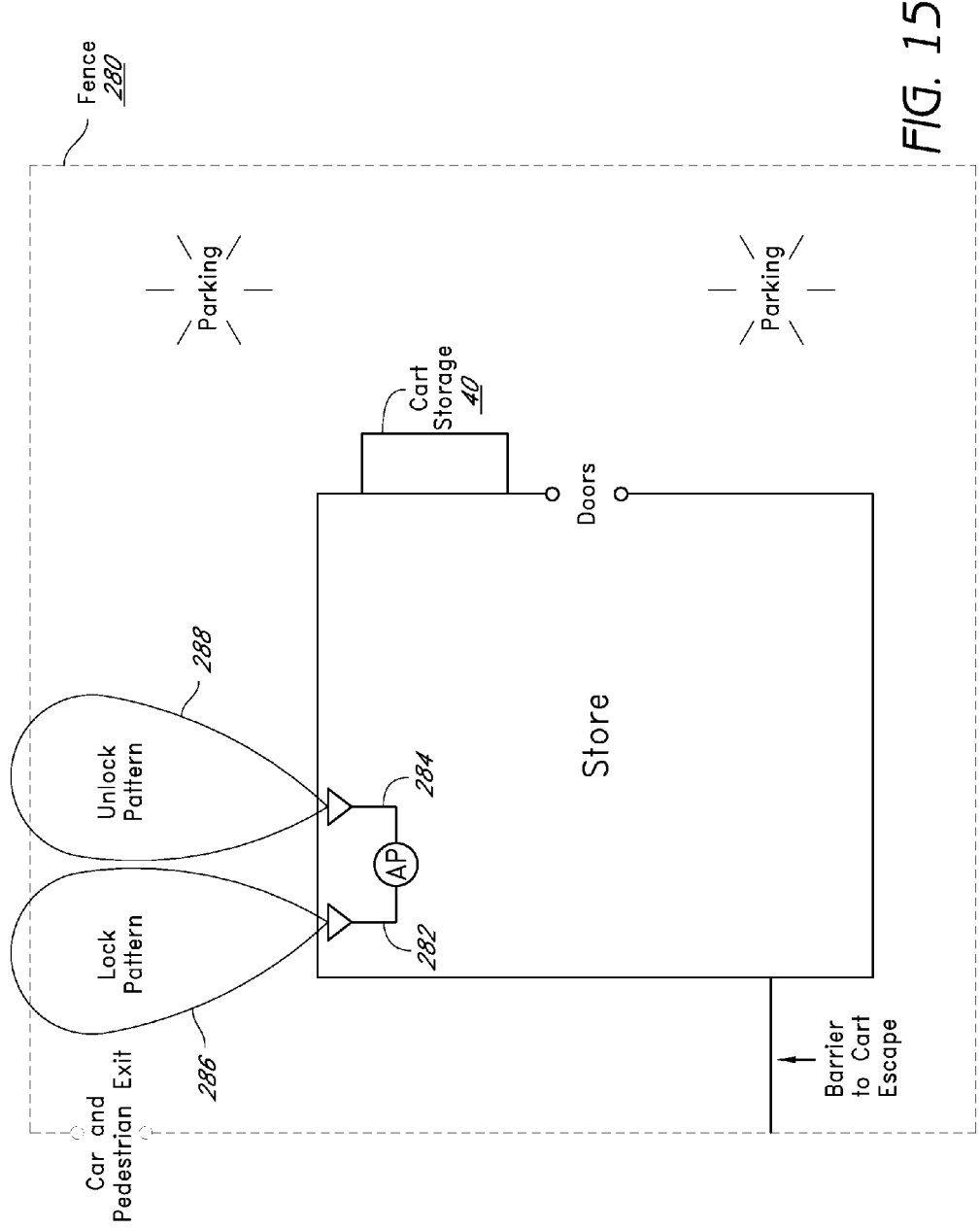
FIG. 15 illustrates a configuration in which a single access point is used to create a lock zone and an adjacent unlock zone in a parking lot area of a store.

The access point also includes a three-way switch 190 that enables the RF transceiver 182 to be connected to an internal antenna, a first external antenna port, or a second external antenna port. The internal antenna is preferably used primarily or exclusively for communications with other access points and/or the CCU. The external antenna ports may be used to connect one or two directional antennas to the access point. These directional antennas may be used to create zones for communicating with and tracking the locations of cart transceivers, as described above. One example of how an access point can use the two external antennas to create two different control zones is shown in FIG. 15 and discussed below. A directional antenna may also be used to provide connectivity when an access point is mounted at a relatively remote location, such as in a distant area of the store parking lot, where the gain of the internal antenna is insufficient to achieve reliable communication. In alternate embodiments, the access points may support a greater number of external antennas, and/or may include two or more complete RF subsystems (see FIG. 17, discussed below).

The access point also includes an interface 192 for enabling the microcontroller 180 to communicate with a store security system. This interface 192 may be used for various purposes, such as the following: (1) notifying the store security system of whether the AP is receiving AC power or has experienced an internal fault; (2) enabling the security system to place the APs in a "safe mode" in which the APs command all of the cart transceivers to remain unlocked at the building exits; this mode may be used when, for example, a fire alarm occurs; (3) activating a security system alarm, or generating a video surveillance capture event, in response to an inferred theft event.

The various components of the access point may be housed within a plastic or other housing that is adapted to be mounted to a fixed or mobile structure. The housing may, for example, be approximately the size of a standard chalk board eraser.

Where fine grain tracking of in-store customer activity is desired, access points can be positioned strategically throughout the store, such as in every department, aisle, checkout area, etc. Each such access point may be configured to periodically (e.g., once every 5 seconds) identify, and report to the CCU, all of the cart transceivers in its respective zone.

The design of the transceiver used in the CCU may be the same as or similar to the access point design shown in FIG. 10.

Figure 11:
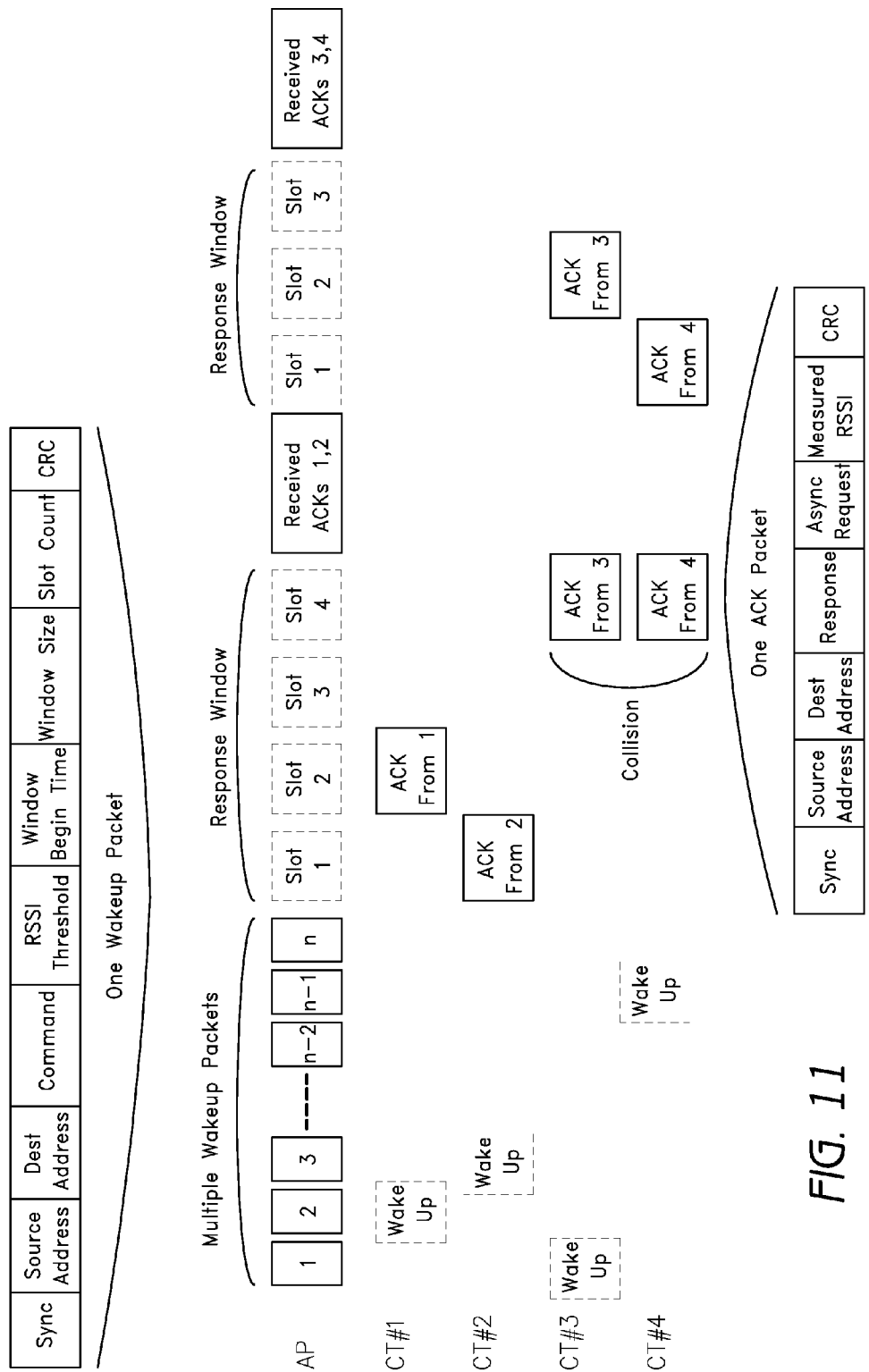
FIG. 11 illustrates, in example format, a communications protocol that may be used for communications between access points and shopping carts.
Figure 12:
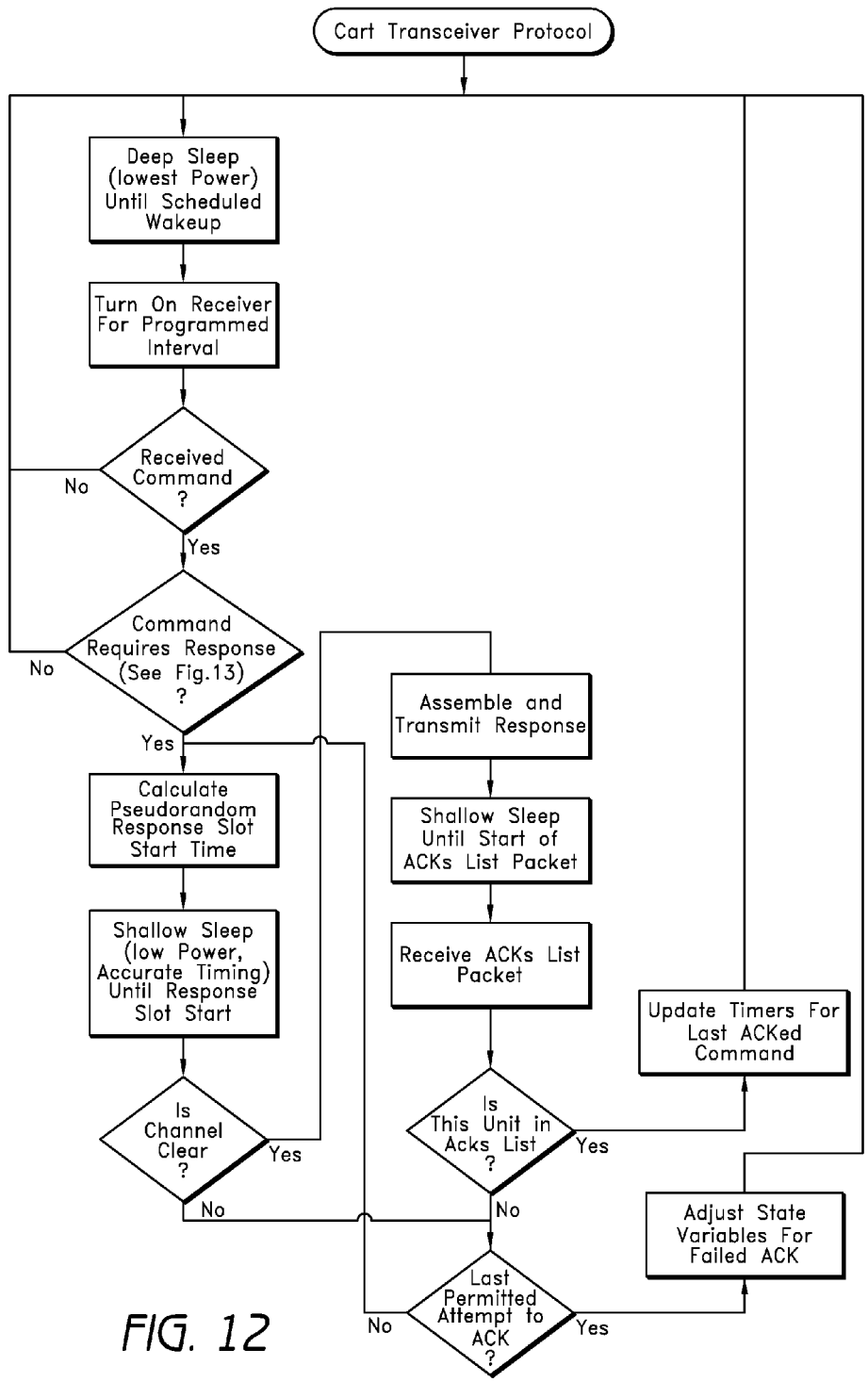
FIG. 12 illustrates a program loop that may be executed by the cart transceivers to implement the protocol of FIG. 11.
Figure 13:
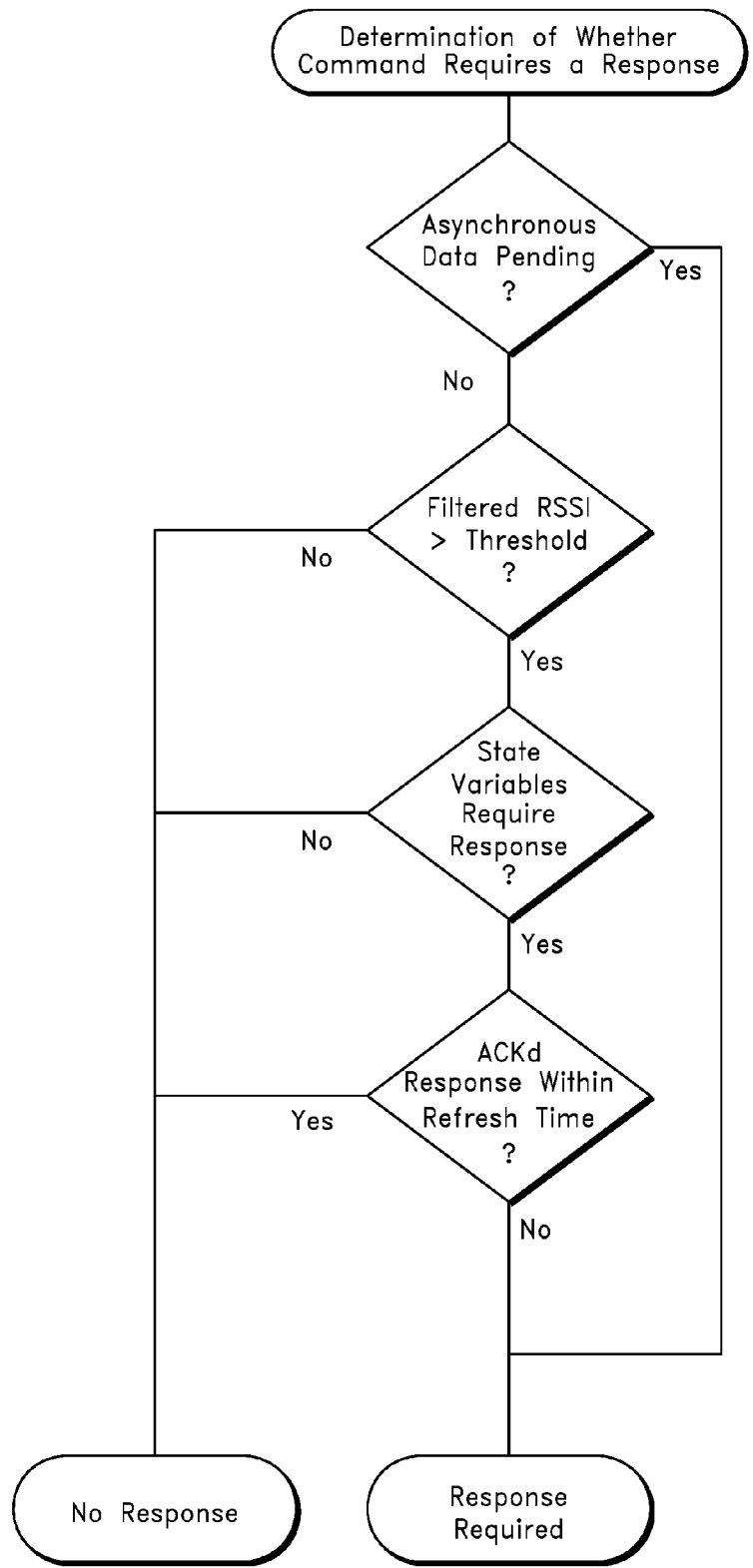
FIG. 13 illustrates additional logic that may be used to implement the "respond to a command" decision block in FIG. 12.

VII. Communications Protocol (FIGS. 11-13)

One example of a protocol that may be used for wireless communications between "controllers" (devices that initiate transmissions) and "targets" (devices that respond to communications from a controller) will now be described with reference to FIGS. 11-13. In the preferred embodiment, the cart transceivers and the CCU act only as targets, meaning that they do not initiate transmissions on the wireless network. Access points (APs) and mobile control units (MCUs), on the other hand, are capable of acting as either a controller or a target. In other embodiments, the CCU may be capable of acting as a controller. For purposes of illustration, the protocol will be described herein in the context of communications between the access points (acting as controllers) and the cart transceivers, although the description is also applicable to other types of nodes.

The protocol advantageously allows the cart transceivers to remain in a very low power state most of the time. For example, in one embodiment, each cart transceiver (CT) wakes up approximately every 1.8 seconds to listen for a transmission from an access point, and then returns to its low power state after one millisecond if it does not receive a transmission that requires a response or other action. If the cart transceiver detects an AP transmission that requires a response, it remains active until a response window occurs, and then transmits its response to the access point.

The cart transceiver (CT) can adjust the frequency with which it wakes up under specific conditions where lower communication latency is desirable and where the extra power consumption is acceptable, e.g. when passing through a very narrow exit zone or by a potential payment point. As one example, an access point that has a small antenna footprint or zone may command nearby CTs to wake up more frequently when detecting RSSI levels above a specified threshold.

The access points preferably use both unicast (target-specific) and multi-cast addressing to send messages to the cart transceivers. An example of a multi-cast message is a message addressed to "all cart transceivers that are locked," or "all cart transceivers of carts that are moving." Because multiple cart transceivers can respond to a multicast transmission, the response window is divided into multiple response slots, and the cart transceivers pseudo-randomly select between the available response slots. The access point acknowledges the responses it receives, enabling the cart transceivers to detect and retry unsuccessful responses (e.g., those that produced collisions).

FIG. 11 illustrates a scenario in which an access point AP sends a multicast message that is applicable to four cart transceiver (CT) devices. Solid boxes in FIG. 11 represent packet transmissions, and dashed boxes represent packet receptions or reception slots. The access point (AP) initially sends a sequence of wakeup packets. As illustrated, each wakeup packet includes the following: (1) a synchronization pattern, (2) a source address (i.e., the unique address of the transmitting access point), (3) a destination address (e.g., "all carts," "all carts in category X," or "cart 12345"), (4) a command, (5) an RSSI threshold (i.e., a minimum RSSI value that needs to be detected by the cart transceiver for the cart transceiver to respond), (6) a window begin time indicating a length of time before the response window begins, (7) the size of the response window, (8) the number of slots in the response window, and (9) a CRC value.

In one embodiment, the RSSI threshold refers to a filtered RSSI value, so that a cart transceiver will not respond to an AP when the cart transceiver is not in the AP's antenna footprint or zone, even if anomalous RF propagation causes a single RSSI measurement to be anomalously high. The RSSI filtering method may be similar to the method described below in the section on queue count estimation, though the parameters of the method may be adjusted to reflect that this filter computation is preferably performed by the relatively low-power cart transceivers rather than the APs. A CT may generate a filtered RSSI value for a given AP from wakeup-packet-specific RSSI values generated by the CT during the wakeup sequence, and/or from RSSI values generated from recent transmissions of the AP.

The slot length is specified implicitly by the combination of the response window size and the number of slots. Typically, the AP will select a slot size that corresponds to the expected response size given the type of command being issued.

In cases where the command including its parameters is too long to fit in the space allocated in the wakeup message format, the command field present in the wakeup packet indicates the nature of a forthcoming command. The response window beginning time is then interpreted by the CT as the beginning of an additional transmission from the access point which contains the remainder of the command. The response window then follows immediately after the additional command information. Any CT which receives the wakeup and which is a potential addressee of the command based on the information present in the wakeup message will then wake up as if the CT did have a response, receive the additional command information, and then determine whether a response is required.

Table 1 lists some of the commands that can be issued to a cart transceiver. In general, these commands may be issued from either an AP or a MCU, though it is unlikely that certain commands would be issued from an MCU, e.g. Report zone entry.

TABLE 1

EXAMPLE COMMANDS ISSUED TO CARTS

| Command | Description |
|---|---|
| Report zone entry | A CT that is a target of this command responds if it is in the AP's zone, as determined by measuring the filtered RSSI of the AP's transmission, and if the CT has not previously reported being in the AP's zone within a time period specified by the command. As an energy consumption and RF spectrum use optimization, CTs report once when they enter a zone, then restate their presence in the zone at a configurable interval which is set in the command from the AP |
| Unconditional lock | A CT that is a target of this command immediately locks its wheel if not already locked. Such a command may, for example, be transmitted continuously by an AP positioned near the entrance/exit of a parking lot that is surrounded by a fence, such that installation of a VLF line can be avoided. |
| Unconditional unlock | A CT that is a target of this command immediately unlocks its wheel if locked. Such a command may, for example, be transmitted continuously by an AP that defines a parking lot area in which cart use is permitted (e.g., an area adjacent to an unconditional lock zone). See FIGS. 15-17, discussed below, for examples of how the unconditional lock and unlock commands can be used to create RSSI-based lock and unlock zones. |

TABLE 1-continued

EXAMPLE COMMANDS ISSUED TO CARTS

| Command | Description |
| --- | --- |
| You are being retrieved | An AP mounted on a cart retrieval unit 40 may transmit this command continuously to all carts falling in its zone, as created via a directional antenna. A CT that receives this command may do one or more of the following: (1) enter an unlocked state if currently locked, (2) refrain from locking if a VLF signal is detected, (3) enable skid detection, or change the parameters used for skid detection. |
| Initiate queue count | All CTs that are targets of this command initiate a queue counting procedure in which they transmit messages in sequence, and measure and report the resulting RSSI values of the transmissions they hear. This data is then used by the initiating AP, or another node (e.g., the CCU), to estimate the number of carts that are queued. |
| Status request | A CT that is the target of this command returns predefined status information, which may include battery level, lock/unlock status, number of lock/unlock cycles performed, results of any diagnostic operations or detected faults, and various other types of information. |
| Query calibration, configuration, and mode constants | A CT that is the target of this command returns one or more values of calibration constants, configuration information, or quasi-constant values which affect the wheel's behavior. This command is distinguished from "Status request" in that the values returned by this query cannot change as a result of external events, but only as a result of being explicitly set by a "Set calibration, configuration, and mode constants" command. |
| Set calibration, configuration, and mode constants | A CT that is the target of this command changes one or more values of calibration constants, configuration information, or quasi-constant values which affect the wheel's behavior according to the content of the command. |
| Program Download | This command is issued in unicast mode only, and is used to upgrade the program code executed by the target CT |

With further reference to FIG. 11, because the wakeup sequence exceeds the duty cycle of the cart transceivers, all four cart transceivers detect a wake up packet and respond during one of the four response slots. Each response is in the form of an acknowledgement (ACK) packet that includes the following: (1) a synchronization pattern, (2) a source address (i.e., the unique address of the responding cart transceiver), (3) a destination address (i.e., the unique address of the access point), (4) a response message, the content of which depends on the command from the access point, (5) an async request (discussed below), (6) a filtered RSSI value measured by the cart transceiver during the preceding wake up sequence, and (7) a CRC value.

The async field provides a mechanism for a cart transceiver to notify the access point that it has some unsolicited data to report. The cart transceiver may have such data to report when, for example, it detects a VLF field code, EAS signal, magnetic marker, or skid event. In one embodiment, the cart transceiver uses the async field to notify the access point of the type of the unsolicited data; the access point thereafter schedules a unicast interrogation of the cart transceiver to retrieve this data. Because the access points ordinarily transmit commands, such as "report zone entry" commands, on a regular basis (e.g., every few seconds), the async feature provides a mechanism for all types of cart status information to be retrieved substantially in real time.

In the example shown in FIG. 11, the ACK packets from CT1 and CT2 are successfully received and acknowledged by the access point. The ACK packets from CT3 and CT4, on the other hand, collide with each other and are not acknowledged. CT3 and CT4 determine that their responses were not successfully received by the absence of an acknowledgement. CT3 and CT4 thereafter successfully retry their ACK packet transmissions, resulting in the access point's acknowledgement of both.

FIG. 12 illustrates a program loop that may be executed by each cart transceiver to implement the protocol described above. FIG. 13 illustrates steps performed to implement the "command requires response" decision block in FIG. 12.

Because the access points (APs) are capable of transmitting at significantly higher power levels than the cart transceivers (CTs), a significantly higher bit rate is preferably used for the downlink to the carts than for the uplink to the access points. This reduces the disparity that would otherwise result between the transmission ranges of the two types of devices. The relatively high bit rate on the downlink also allows the access points to send out wakeup packets at a reasonably high rate (e.g., one every two milliseconds); consequently, the cart transceivers only have to listen for a wakeup packet for a very short time before re-entering a low-power state.

Frequency hopping may be used for transmissions in both directions. The access points preferably maintain synchronization with each other by monitoring transmissions from the CCU or each other.

VIII. Storage and Analysis of Cart History Data (FIG. 14)

Figure 14:
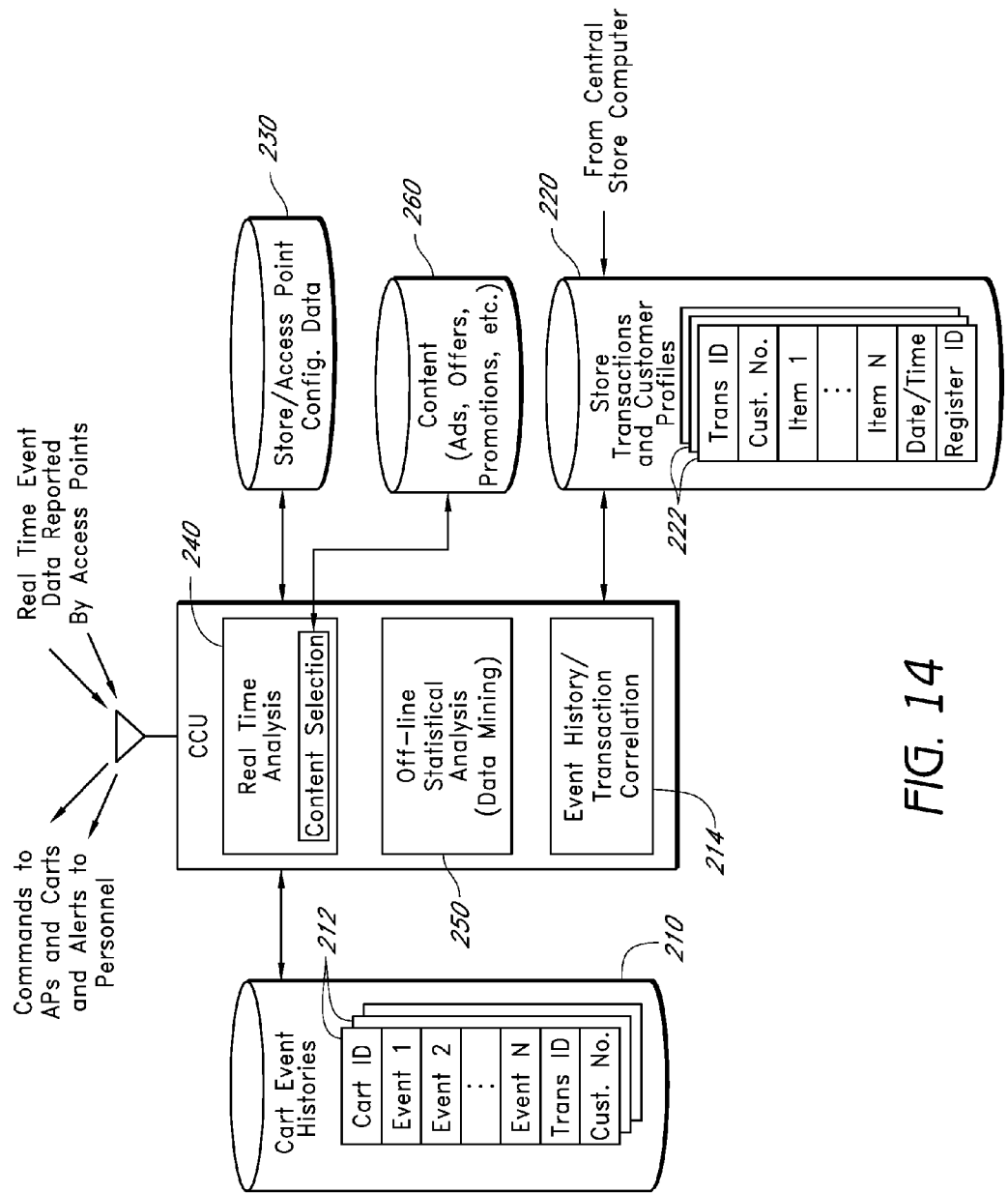
FIG. 14 illustrates one embodiment of a CCU that stores and analyzes event data captured via two-way communications with the carts.

FIG. 14 illustrates one embodiment of a CCU configured to analyze cart event data acquired via two-way communications with the cart transceivers (CTs). As illustrated, the CCU receives cart event data substantially in real time as such data is retrieved or generated by the access points. Each such event may, for example, include an event type, an event timestamp, the ID of the access point (AP) reporting the event, the ID of the cart transceiver (CT) to which the event applies (if applicable), and any associated data. For example, an event may specify that AP#1 detected CT#2 into its zone at a particular time, and that CT#2 reported an RSSI value of X.

The CCU stores the event data in an event histories database 210, which may be a relational database. Each cart session record 212 shown in the event histories database corresponds to a particular cart and shopping session, and contains the event data associated with that shopping session. In one embodiment, the CCU treats a cart's entry into the store as the beginning of a shopping session, and treats the cart's subsequent exit from the store as the end of a shopping session; however, different criteria may be used for different store configurations and applications. The cart IDs may be the unique IDs or addresses of the corresponding cart transceivers.

The CCU also preferably accesses a database 220 of purchase transaction data and customer profile data maintained by or obtained from the store's central computer. As illustrated, this database 220 may contain records 222 of specific purchase transactions of specific customers, including identifiers of the purchased items.

As illustrated, a given session record 212 may, in some cases, include a store transaction ID and/or a customer number. The store transaction ID identifies the checkout transaction, if known, as produced by a conventional point-of-sale system and recorded in the database 220. The transaction IDs are attached to the corresponding session records 212 by an event-history/transaction correlation component 214 that runs on the CCU. In one embodiment, this component 214 compares purchase transaction data stored in database 220 with the cart event data to uniquely match specific transaction records 222 with specific cart session records 212. This may be accomplished by, for example, comparing the data/time stamp and register ID information contained in a store transaction record 222 to the cart event data reflective of a checkout event. If a sufficient degree of correspondence exists between time and location, a given session record 212 may be matched to a given transaction record 222.

If the recorded time and location information is insufficient to match the cart session under consideration to a particular transaction, the correlation component 214 may compare the items identifiers contained in the potentially matching transaction records 222 to the path taken by the cart. A database 230 of store and access point configuration data may be used for this purpose. If, for example, a particular transaction includes items (and especially bulky items) that are not available along the path followed by the cart, the transaction may be excluded as a candidate. If, on the other hand, the purchased items closely match the cart path, a match may be deemed to exist.

The customer number field in the cart session records 212 may be used to store a customer loyalty number, if known. This number may be obtained from the matching transaction record 222, or in embodiments in which the cart includes a display unit 150 with a card reader 160 (FIG. 9), from the event data retrieved from the cart transceiver. If the customer loyalty number is acquired via a card reader on the cart, the acquired number may also be used to match the cart session record 212 to a corresponding transaction record 222.

The analysis components that run on the CCU in the example embodiment of FIG. 14 include a real time analysis component 240 and an off-line statistical analysis component 250. The real time analysis component 240 analyzes event data as it is acquired for purposes of identifying real time actions to take. Examples of action that may be taken include transmitting a particular command (e.g., a lock command) to a particular cart, activating an alarm system or video surveillance camera, alerting personnel of the need to retrieve carts from the parking lot, or alerting personnel of the need to open an additional checkout lane.

In embodiments in which the carts 30 include display units, the real time analysis component 240 may also select location-dependent ads or other messages to present to users. For example, upon entry into a particular store department, the CCU may instruct the cart to display a particular ad, promotion, offer, or other message that is specific to that department. If the customer's loyalty number is known at the time (e.g., as the result of entry via a card reader 160 on the display unit 130), the ad or message may also be based on the actions taken by this customer in prior sessions or visits. For example, if the customer regularly purchases milk on visits to the store, and has entered the checkout area without first entering the area where milk is sold, a message may be displayed reminding the customer to do so. The content that is available for display may be selected from a content database 260 and wirelessly downloaded to the cart transceivers, and/or may be cached in the display units.

The component 250 labeled "off-line statistical analysis" in FIG. 14 is responsible for analyzing the cart event history records 212, optionally in conjunction with corresponding transaction records 222, to mine various types of information. One type of information that can be mined is information regarding the effectiveness of the store layout, including product locations. For example, by collectively analyzing cart histories and transaction records of many different customers, a determination may be made that customers frequently linger in a particular area without selecting a product to purchase, or that they frequently look in the wrong location before finding a desired product. The off-line statistical analysis component 250 may also generate data that can be used for targeted or personalized messaging on the display units. Additionally, the off-line statistical analysis component 250 may be used to determine statistics related to the shopping cart inventory of the store, for example, the total number of carts physically present on the premises, the number of carts in active use over specific time periods, which firmware revisions (and associated functionality) are present in the store's cart inventory, etc.

Figure 16:
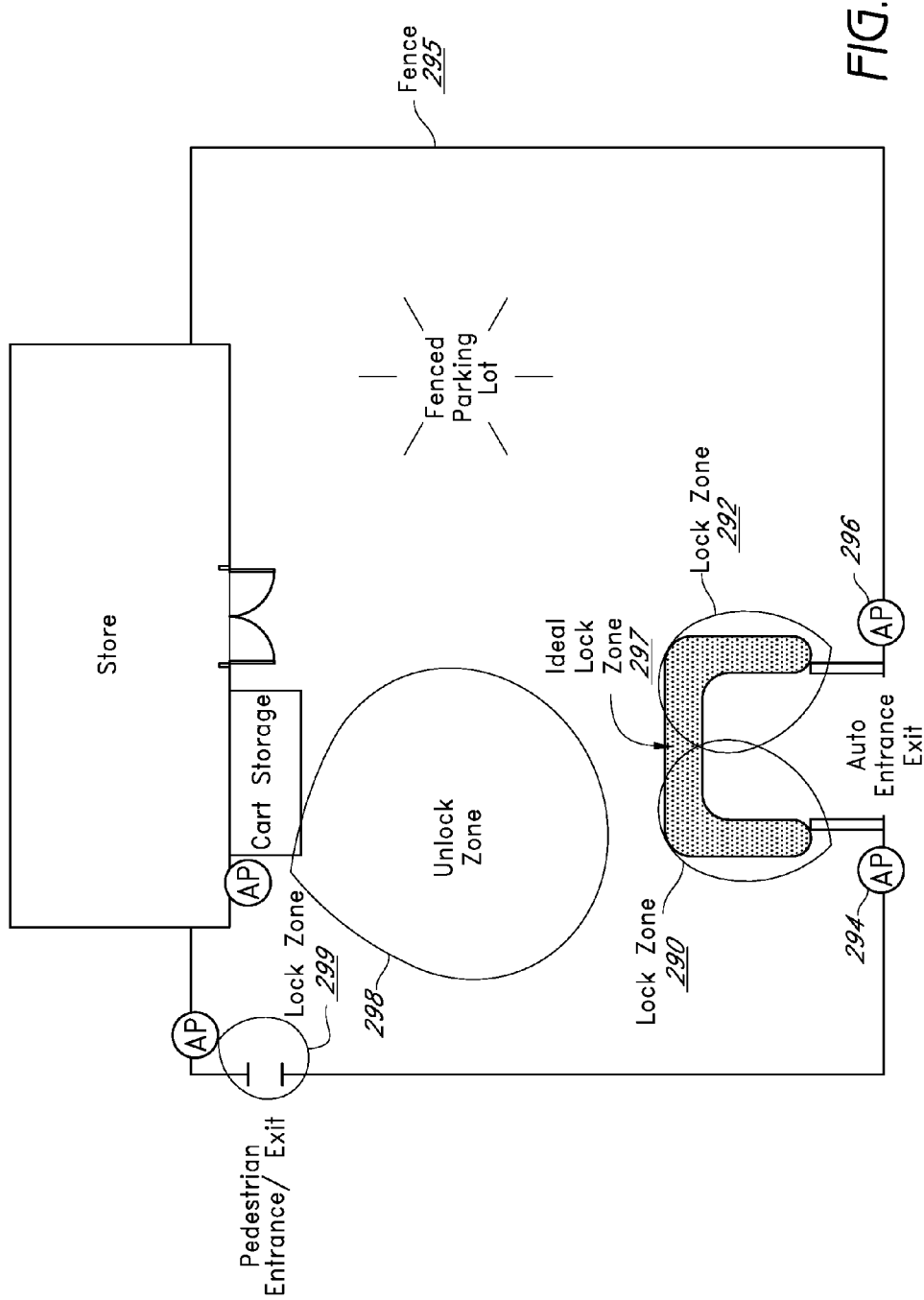
FIGS. 16 and 17 illustrate other examples of how lock and unlock zones can be used to contain shopping carts.
Figure 17:
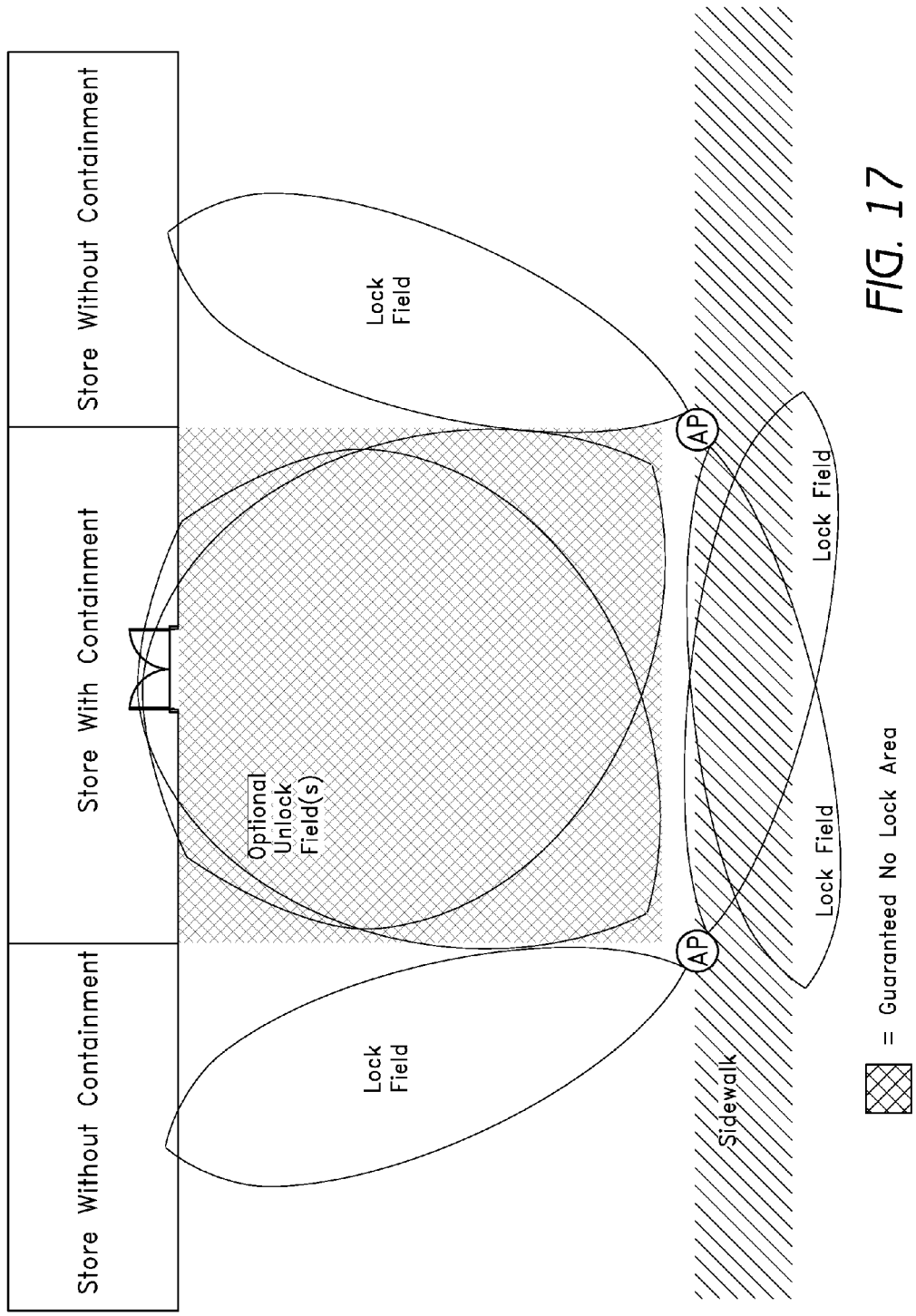

IX. Use of Lock and Unlock Zones to Set Boundaries (FIGS. 15-17)

FIG. 15 illustrates an example store configuration in which the store is surrounded by a fence 280 that serves as a barrier to shopping cart removal. The only opening in the fence 280 that is sufficiently large for cart removal is a car and pedestrian exit. To inhibit theft via this exit without the need for a relatively expensive VLF signal line, a single access point (AP) with two directional antennas 282 and 284 is mounted to an exterior wall of the store. The AP repeatedly transmits an "unconditional lock" command on the first antenna 282 to create a lock zone 286, and repeatedly transmits an "unconditional unlock" command on the second antenna 284 to create an unlock zone. To create these two adjacent but non-overlapping zones, the directional antennas may be spaced apart from each other by an appropriate distance (e.g., 10 feet) and elevated from the ground, and may be pointed somewhat outward and downward to form corresponding RSSI-based lobes or zones at ground level. Each such zone 286, 288 extends from the wall of the store to and beyond the fence 280.

With this configuration, a customer attempting to push a cart 30 through the parking lot exit will have to pass through the lock zone 286, causing the wheel 32 to lock. Upon encountering the lock event, the customer may attempt to drag the cart back to the front of the store, such as to get back a monetary deposit placed on the cart. If the customer does so, the cart will enter the unlock zone 288, causing the wheel 32 to unlock. Thus, the wheel damage that might otherwise occur from dragging the locked wheel is avoided.

A similar arrangement can be used to control the movement of carts through a building exit. Typically the lock zone 286 would be placed on the outside of the building exit and the unlock zone 288 on the inside. Alternatively, the lock zone 286 could be placed immediately inside of the exit and the unlock zone some greater distance inside the building.

FIG. 16 illustrates another example of how AP-generated lock and unlock zones as described above can be used to control shopping cart usage in a store parking lot. As in the prior examples, each leaf-shaped zone represents the area at ground level at which a cart's wheel 32 should see a filtered RSSI that exceeds the threshold specified by the corresponding AP. The two zones 290, 292 located at the auto entrance/exit are lock zones created by two respective APs, 294 and 296. These APs 294 and 296 may be mounted to poles (not shown) on the perimeter fence 295 surrounding the parking lot, with their directional antennas angled toward the ground. Because the areas immediately "above" these two APs in the drawing are valid parking areas where carts should be permitted, the antennas are elevated and angled such that these valid parking areas do not form part of the lock zones. The two lock zones 290 and 292 together provide a good approximation of the ideal lock zone 297 represented by the shaded area in FIG. 16.

With further reference to FIG. 16, an additional lock zone 299 covers a pedestrian entrance/exit. In addition, a relatively large unlock zone 298 is created by an AP mounted near the cart storage area. This unlock zone 298 is positioned relative to the lock zones 290, 292, and 299 such that customers who attempt to return a locked cart to the cart storage area from a lock zone need not travel very far before the wheel is unlocked.

FIG. 17 illustrates an example of how lock and unlock zones can be used in connection with a strip mall. In this example, the center store is the user of the system. The desired behavior is: (1) carts cannot escape past the sidewalk into the street, (2) carts cannot go into the other stores, and (3) carts cannot get far past the parking immediately in front of the center store. To achieve these objectives, two APs are positioned near the sidewalk area, such as on respective poles. Each AP creates two lock zones, one which extends from the sidewalk to one of the stores that does not use cart containment, and one which extends along the sidewalk.

Each AP also optionally creates a relatively large unlock zone that covers the majority of the parking area in from of the center store. To provide this third zone, each AP may be provided with a third external/directional antenna. Time slicing may be used to alternate between the three antennas, or two separate RF transceivers may be included in each AP—one which transmits the unconditional unlock command and the other which transmits the unconditional lock command. As another option, a separate AP or pair of APs could be provided to create the unlock zone.

As will be apparent, lock and unlock zones as described in this section may be implemented using receivers, rather than transceivers, on the shopping carts 30. Thus, for example, in some embodiments of the invention, the RF transceivers included in the locking wheels 32 may be replaced with RF receivers. In addition, lock and unlock zones that are created as described herein can also be used for the containment of other types of carts and vehicles, including but not limited to wheelchairs, hospital beds, gurneys, pharmacy carts, and luggage carts.

In embodiments in which the shopping carts include display units 150, the display unit of a cart 30 that is approaching a lock zone may be instructed to display a warning message. In addition, once the cart has entered a lock zone and the wheel 32 becomes locked, the display unit may instruct the user on how to restore the wheel to an unlocked state, including the location of the nearest unlock zone.

X. Queue Count Estimation (FIGS. 18 and 19)

Figure 18:
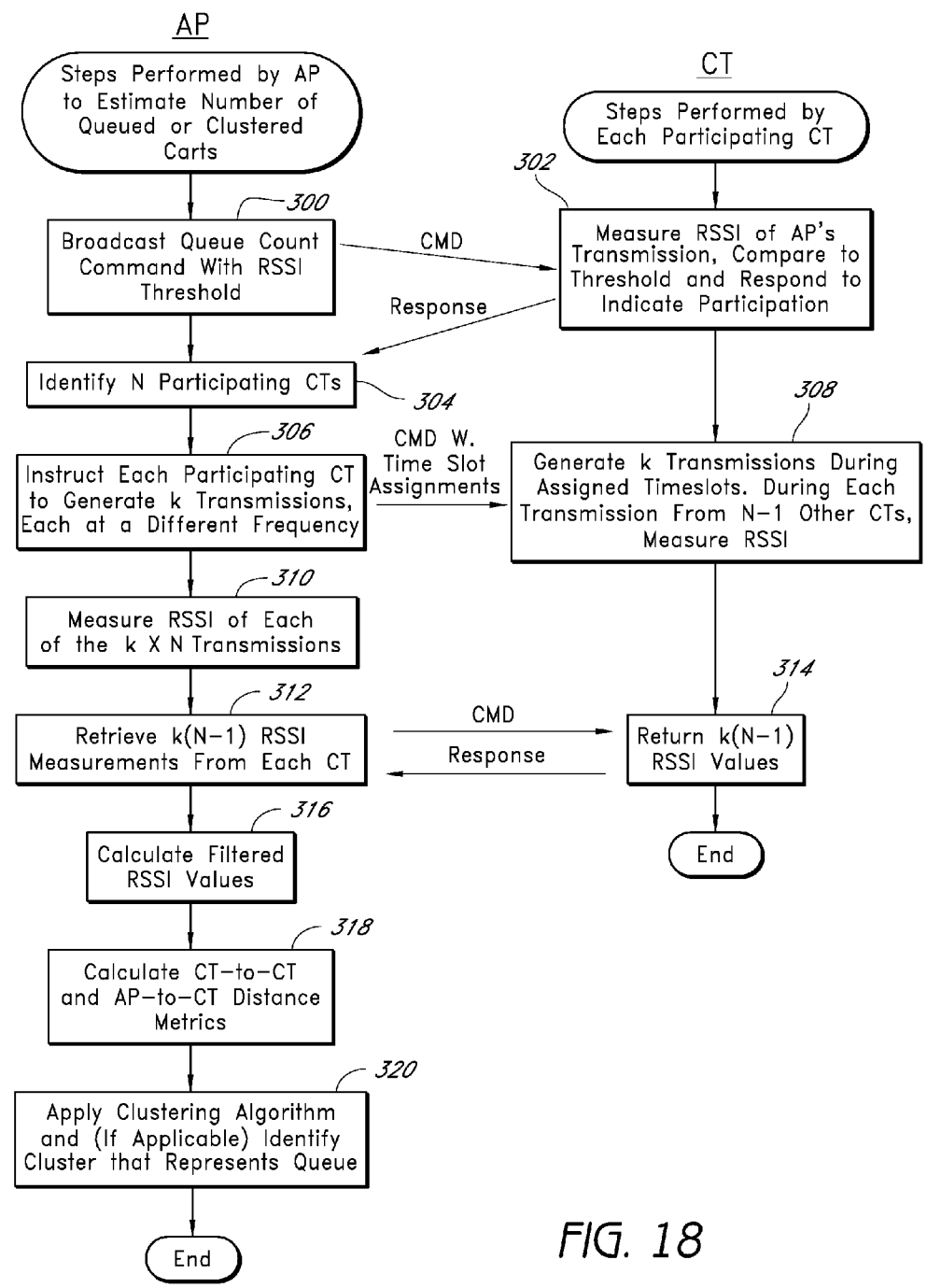
FIG. 18 illustrates a process by which the number of carts that are queued or otherwise clustered in a specific area may be estimated.
Figure 19:
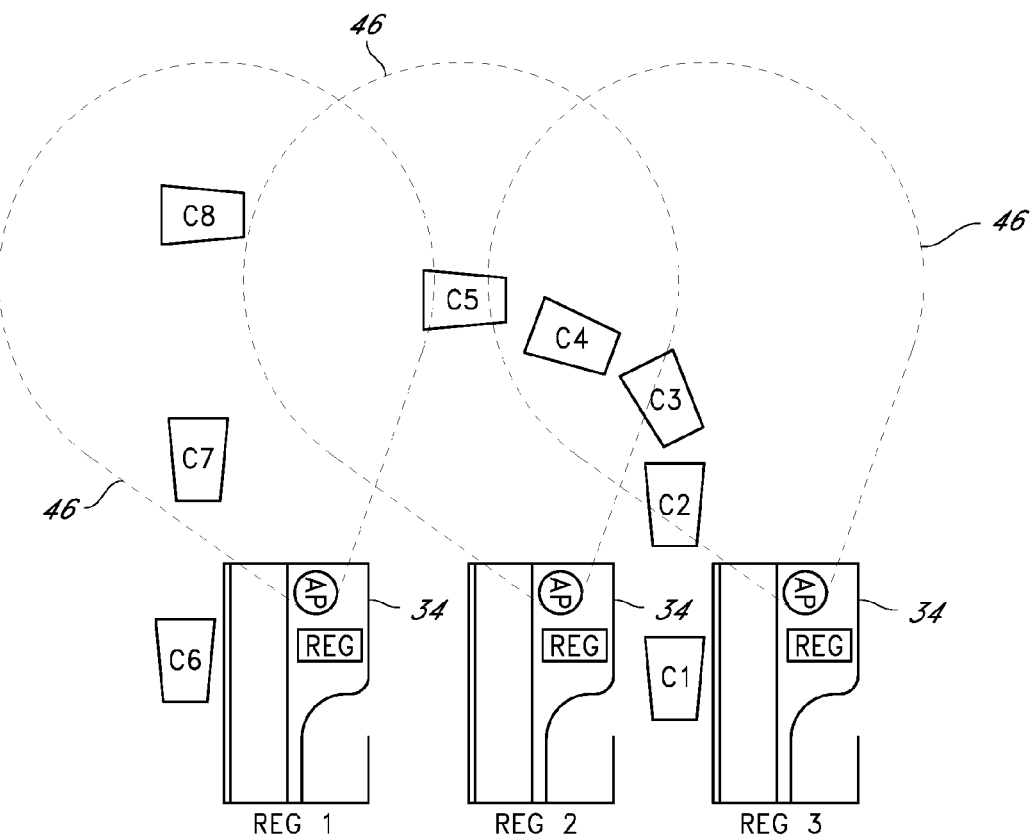
FIG. 19 illustrates an arrangement of shopping carts that can be analyzed via the process of FIG. 18.

FIG. 18 illustrates a process that may be implemented collectively by an access point (AP) and a set of nearby cart transceivers (CTs) to estimate the number of carts 30 currently queued or otherwise clustered together near the access point. This feature has several applications, including the following:

1. Estimating the number of carts 30 queued at a checkout station 34. The system may use the result of this calculation/estimation to automatically alert personnel regarding the possible need to open an additional checkout station. Also, the system may generate and report statistics regarding the distribution of queue lengths over time (e.g., as a function of time of day, day of week, number of registers open, etc.).

2. Estimating the number of carts 30 present in a defined storage area, such as a "cart corral" storage area 36 in a store parking lot (see FIG. 1). In the case of store parking lot applications, the system may use the results of such calculations to automatically alert personnel of the need to retrieve carts from the parking lot.

3. Estimating the number of carts being pushed or otherwise retrieved by an electric cart retriever 40 (FIG. 1). As mentioned above, the results of such calculations/estimations may be used to automatically assess whether the cart retriever is improperly being used to concurrently retrieve more than an authorized number of carts. If such improper use is detected, the system may automatically disable the cart retriever 40.

As illustrated in block 300 of FIG. 18, an access point (AP) initiates the counting process by broadcasting a "queue count" command together with a threshold RSSI value that controls the size of a response zone. The access point preferably transmits this command from a directional antenna that is positioned and configured such that the response zone encompasses, and is larger than, the area in which a queue is expected to form. The zones may be generally similar in configuration to the zones 46 and 48 shown in FIG. 2. In the case of checkout stations 34, the AP that transmits the command is typically mounted at or close to a particular checkout station 34, and the zone 46 encompasses the checkout station's cart queuing area (see FIG. 2). In the case of cart storage areas 34, the AP is typically mounted to, and the zone encompasses, a particular cart storage area. In the case of an electric cart retrieval unit 40, the AP is preferably mounted to the cart retrieval unit, and the zone encompasses the area in which the carts being retrieved typically reside.

As illustrated in block 302 of FIG. 18, each cart transceiver (CT) within the AP's transmission range measures the RSSI of the AP's transmission, and if this value exceeds the RSSI threshold, responds to indicate its participation in the queue-size estimation process. (Note that FIG. 18 only shows the actions of a single one of the many CTs/carts that may participate, and that each participating CT/cart may perform the steps shown.) In block 304, the AP identifies the N participating CTs from the responses it receives.

In block 306, the AP assigns a set of k unique transmission timeslots to each participating CT, and initiates a process in which each CT uses its assigned timeslots to generate k transmissions, each of which preferably occurs at a different frequency. The use of multiple different transmission frequencies provides a mechanism for reducing errors caused by frequency-selective effects such as multi-path distortion and antenna shadowing. As depicted in blocks 308 and 310, when one CT transmits, the other participating CTs (as well as the AP) measure the RSSI of the transmission. Thus, during this process, each participating CT generates k(N−1) RSSI values. Although the k transmissions from a given CT need not be consecutive (e.g., the transmissions from different CTs may be interleaved), they are preferably sufficiently close in time such that significant cart movement does not occur between the first and last transmissions. In blocks 312 and 314, the AP retrieves the k(N−1) RSSI values generated by each participating CT.

In block 316, the AP generates a filtered RSSI value from each set of k RSSI values. In one embodiment, k=8, and the filtered RSSI value is generated by discarding the two highest and two lowest RSSI values and then taking the arithmetic average of the remaining four. Thus, for example, if CT1 and CT2 both participate, CT1 would generate a separate RSSI value for each of CT2's eight transmissions, and these eight RSSI values would be converted into a single filtered RSSI value. Since the RSSI values are preferably log linear, the arithmetic average of the RSSI readings is the log of the geometric mean of the four middle received RF power values. The task of generating the filtered RSSI values (designated hereinafter by the notation RSSI*) may alternatively be performed by the CTs that took the corresponding RSSI measurements, or by some other node such as the CCU. Although filtered RSSI values are used in the preferred embodiment, their use is not required.

The result of block 316 is a set of N(N−1) $RSSI^*_{i \to j}$ values, where $RSSI^*_{i \to j}$ is the filtered RSSI of the ith CT as measured at the jth CT. (Note that the term "CT" in this discussion may be replaced with "wheel 32" in embodiments in which the CT is contained within the wheel.)

In block 318, the AP (or some other node) calculates a pair-wise distance metric for each CT pair i≠j. The preferred method of calculating distance metrics takes advantage of, but does not require, temporal stability of the cluster of carts/CTs. The nth iteration distance metric d(i,j,n) may be defined by the following recurrence relations:

$$d(i,j,n) = f(RSSI^*_{i \to j}, RSSI^*_{j \to i}, d(i,j,n-1)) \text{ and}$$
$$d(i,j,0) = f_0(RSSI^*_{i \to j}, RSSI^*_{j \to i})$$

Several different $f$ and $f()$ functions can be used in the above calculation. Over a statistical ensemble, RSSI* is an invertible monotonic function of distance which can be determined by straightforward experimentation. An AP-CT distance metric may also be calculated for each of the N cart transceivers.

In block 320 of FIG. 18, the AP or another node applies a clustering algorithm to the calculated distance metrics to identify any CTs/carts that are clustered together. Given N(N−1)/2 d(i,j,n) values for the current n, cluster formation can be performed by locating the CT which has the highest RSSI* (which is the CT/cart which is probably closest to the AP), and forming a cluster by the known algorithm of single-link (or single linkage) hierarchical clustering. This may be accomplished as follows. Begin by considering each CT as in a cluster of its own. The distance metric between two clusters is defined as the minimum pair-wise distance metric between the two clusters. Merge in each step the two clusters whose two closest members have the smallest distance metric. Merging continues until no two clusters have a distance metric less than a programmable threshold. The cluster which contains the CT probably closest to the AP (as specified above) is taken to be the queue, and the number of elements in that cluster is taken to be the length of the queue. Any of a variety of other known clustering algorithms may alternatively be used. The process shown in FIG. 18 may executed separately for each checkout station 34, and the results may be combined to evaluate which carts belong to which queues.

In some applications, the above process may be performed merely to estimate the total number of carts that are clustered together, without regard to how or whether these carts are queued. This may be the case where, for example, the number of carts in a cart storage area 36 is being estimated.

FIG. 19 illustrates an example scenario involving three registers, nos. 1-3, and eight shopping carts, C1-C8. Register 2 in this example is closed. A human can easily see that there are four carts (C2-O5) queued at register 3. The clustering process will start register 3's cluster formation with C2. As the result of the calculated intra-cart distance metrics determined using filtered RSSI values, C3-O5 will then be clustered with C2 as part of register 3's queue, even though C4 and C5 are closer to register 2 than to register 3. Similarly, C7 forms an isolated queue of one at register 1. C8, which a human can see is probably just passing through, is not part of either register 1's queue or register 2's queue because its distance metric to the nearest other cluster member (probably C7, possibly C5 depending on the wheels' angles) is over the threshold.

XI. Maintaining Carts in Unlocked State During Retrieval (FIG. 20)

As mentioned above, the system may include a mechanized cart retrieval unit 40 (FIG. 1), which may be a cart pusher or a cart puller, that applies a force to a nest 41 of carts to facilitate retrieval. In one embodiment, as the cart retrieval unit 40 retrieves a nest 41 of carts 30, it commands each of the carts/CTs, via its access point (AP) or another type of transmitter, to remain unlocked. As a result, if the nest 41 is pushed across a VLF signal line that would ordinarily cause the carts' braking mechanisms to become locked, or is pushed through a lock zone created via an access point, the braking mechanisms of the retrieved carts will remain unlocked. The commands may be sent via a directional antenna that is mounted and positioned on the cart retrieval unit 40 so as to substantially limit its command transmissions to the nest of carts.

Figure 20:
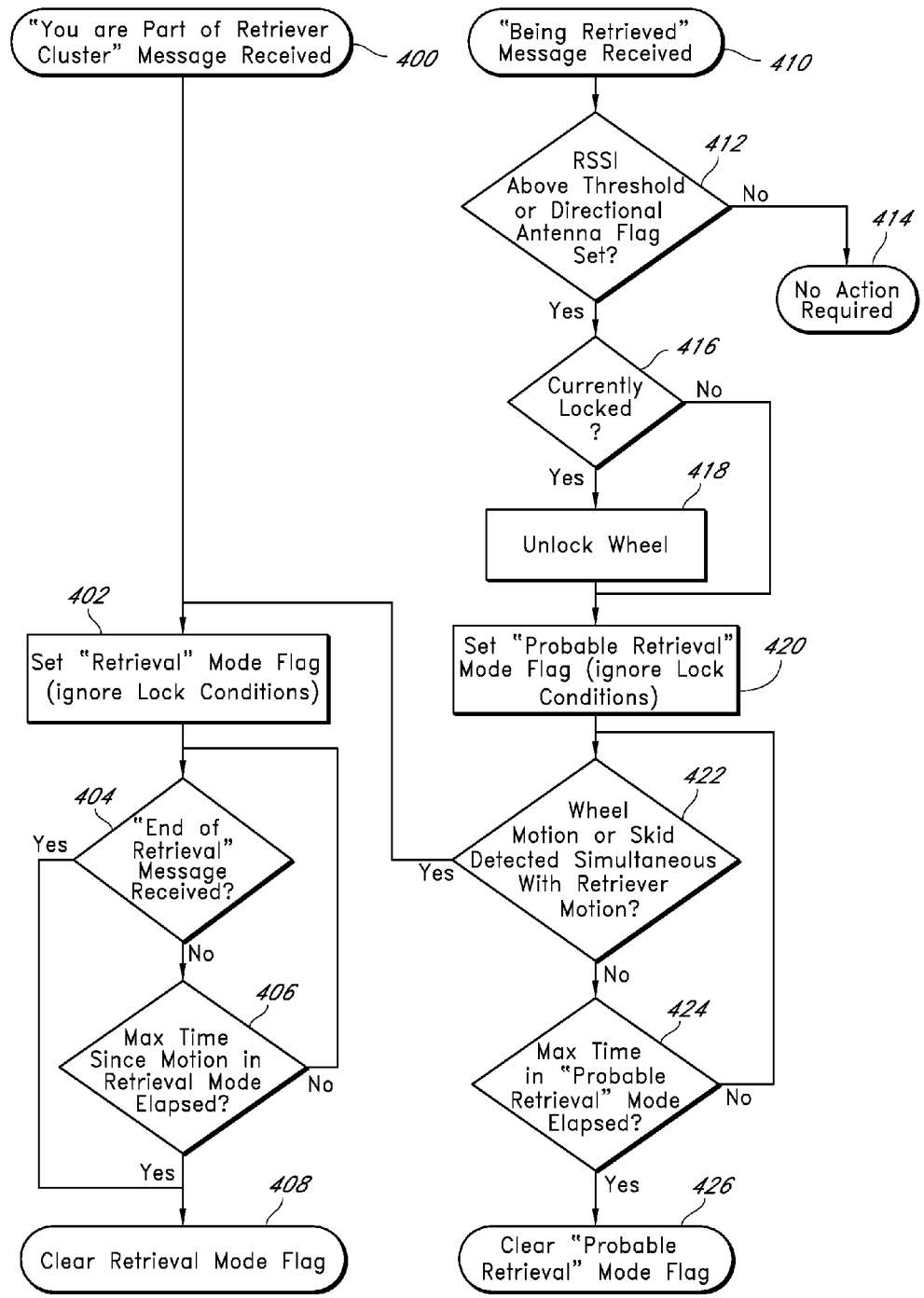
FIG. 20 illustrates one example of logic that may be incorporated into a cart transceiver or wheel to facilitate cart retrieval operations.

FIG. 20 illustrates logic that may be incorporated into the cart transceivers (CTs) to facilitate mechanized cart retrieval operations. As represented by block 400, one type of command that may optionally be transmitted by the retriever-mounted AP is a "you are part of a retriever cluster" command. For example, when the operator initially depresses a button to initiate retrieval of a nest of carts 41, the retriever-mounted AP may use the cluster/queue identification methods described in the preceding section to identify the carts in the nest 41, and may then notify these carts (e.g., via unicast command transmissions) that they are part of a cluster or nest being retrieved. Upon receiving the "you are part of a retriever cluster" command, the CT sets a retrieval mode flag (block 402) which causes the CT to ignore lock conditions, such as those ordinarily caused by VLF signal lines and/or AP-generated lock zones. The CT then remains in a loop until either an "end of retrieval" command is received from the retriever-mounted AP or a time out event occurs (blocks 404 and 406), and then clears the retrieval mode flag (block 408).

As depicted by block 410, the retriever-mounted AP 40 may additionally or alternatively be configured to broadcast a "you are being retrieved" command when the retrieval operation is initiated. This command preferably includes a field indicating whether it is being sent from a directional antenna. In response to receiving this command, the CT determines whether either (1) the RSSI associated with the command transmission exceeds the AP-specified threshold, or (2) the command was transmitted via a directional antenna (block 412). If neither condition is true, no further action is taken (block 414).

If either of the conditions in block 412 is true, the CT unlocks the wheel if currently locked (blocks 416 and 418) and sets a "probable retrieval" flag (block 422). The CT then enters into a loop in which it either detects wheel movement or skidding, or times out (blocks 424 and 426). If wheel movement or skidding is detected, the CT follows the sequence depicted by blocks 402-408, discussed above. (If a skid event is detected, the CT may also send a skid event message to the retrieval unit, as described above). If a timeout event occurs in block 426, the probable retrieval flag is cleared and the process ends.

XII. Conclusion

The various functions described above as being performed by an access point, cart transceiver, CCU or MCU may be embodied in or controlled by executable software code that is stored in a computer memory or other computer storage device. Some of the functions may alternatively be embodied in application-specific circuitry. Any feasible combination of the various features and functions described herein may be embodied in a given system, and all such combinations are contemplated.

As will be recognized, the wheel braking mechanism described herein can be replaced with another type of electromechanical mechanism for inhibiting the motion of the cart, including mechanisms that cause one or more of the wheels of the cart 30 to be lifted off the ground.

Although this invention has been described in terms of certain embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the claims.

What is claimed is:

1. A system for tracking use of a human-propelled cart, comprising:
   a display unit that attaches to the human-propelled cart, the display unit comprising a display, a controller and a wireless transceiver, the display unit configured to communicate bi-directionally on a wireless network via the wireless transceiver; and
   a wheel assembly that attaches to a frame of the human-propelled cart, the wheel assembly comprising a wheel, a controller, and communication circuitry, the controller of the wheel assembly configured to detect at least one type of event in which the wheel assembly detects a signal from a device that is external to the human-propelled cart and the wheel assembly, the controller of the wheel assembly additionally configured to report occurrences of the at least one type of event to the display unit via the communications circuitry;
   wherein the controller of the display unit and the controller of the wheel assembly are programmed to communicate bi-directionally with each other over a connection that is separate from the wireless network;
   wherein the controller of the display unit is configured as a master controller in a master-slave arrangement, and the controller of the wheel assembly is configured as a slave controller in the master-slave arrangement;
   wherein the display unit is programmed to report over the wireless network occurrences of at least some of the events detected by the wheel assembly.

2. The system of claim 1, wherein the wheel assembly further comprises a brake unit that is capable of being activated by the controller of the wheel assembly to inhibit movement of the human-propelled cart, and the display unit is configured to display a warning message associated with activation of the brake unit.

3. The system of claim 2, wherein the wheel assembly comprises a Very Low Frequency (VLF) receiver, and the controller of the wheel assembly is configured to report to the display unit occurrences of events in which the VLF receiver detects a VLF signal.

4. The system of claim 1, wherein the display unit includes an audio signal generator capable of outputting an audible alert signal.

5. The system of claim 1, wherein the wheel assembly comprises a vibration sensor that senses wheel vibration events, and the controller of the wheel assembly is configured to report to the display unit events in which wheel vibration is detected by the vibration sensor.

6. The system of claim 1, wherein the wheel assembly comprises a magnetic field sensor, and the controller of the wheel assembly is configured to report to the display unit occurrences of events in which the magnetic field sensor detects a magnetic field from a magnetic marker that is external to the wheel assembly.

7. The system of claim 1, wherein the controller of the wheel assembly and the controller of the display unit are configured to communicate bi-directionally with each other over a set of wires.

8. The system of claim 1, wherein the wheel assembly and display unit are configured to communicate with each other wirelessly.

9. The system of claim 1, wherein the display unit comprises an RFID reader capable of reading RFID data of items placed in the human-propelled cart, and the display unit is configured to display information regarding the items placed in the human-propelled cart.

10. A system for tracking use of a human-propelled cart, comprising:
    a display unit that attaches to the human-propelled cart, the display unit comprising a display and a wireless transceiver, the wireless transceiver configured to communicate bi-directionally on a wireless network; and
    a wheel assembly that attaches to a frame of the human-propelled cart, the wheel assembly comprising a wheel, a controller, and communication circuitry, the controller configured to detect at least one type of event in which the wheel assembly detects a signal from a device that is external to the human-propelled cart and the wheel assembly, the controller additionally configured to report occurrences of the at least one type of event to the display unit via the communications circuitry;
    wherein the display unit is programmed to report over the wireless network occurrences of at least some of the events detected by the wheel assembly;
    wherein the display unit comprises an RFID reader capable of reading RFID data of items placed in the human-propelled cart, and the display unit is configured to display information regarding the items placed in the human-propelled cart;
    wherein the display unit is configured to use an output of the RFID reader, in combination with data regarding movement of the human-propelled cart, to determine whether an item detected by the RFID reader is in the human-propelled cart.

11. The system of claim 9, wherein the display unit is configured to report over the wireless network information regarding the items placed in the human-propelled cart.

12. The system of claim 9, wherein the display unit is configured to output recommendations of items related to the items placed in the human-propelled cart.

13. The system of claim 1, wherein the display unit includes a reader capable of reading a user ID from a device of a user of the human-propelled cart, and is configured to report the user ID on the wireless network.

14. A human-propelled cart, comprising:
a cart frame having a handle;
a display unit attached to the cart frame, the display unit comprising a display, a controller and a radio frequency (RF) transceiver, the display unit configured to communicate bi-directionally over a wireless network; and
a wheel unit coupled to the frame, the wheel unit comprising a wheel and a controller, and comprising circuitry configured to detect at least one type of event in which the wheel unit receives a signal from an external source, wherein the controller of the wheel unit is configured to report, to the controller of the display unit, at least some occurrences of the at least one type of event;
wherein the controller of the display unit and the controller of the wheel assembly are configured to communicate bi-directionally with each other over a connection that is separate from the wireless network;
wherein the controller of the display unit is configured as a master controller in a master-slave arrangement, and the controller of the wheel assembly is configured as a slave controller in the master-slave arrangement;
wherein the display unit is configured to report on the wireless network occurrences of at least some of the events detected by the wheel assembly.

15. The human-propelled cart of claim 14, wherein the wheel unit further comprises a brake unit that is capable of being activated by the controller of the wheel unit to inhibit movement of the human-propelled cart, and the display unit is configured to display a warning message associated with activation of the brake unit.

16. The human-propelled cart of claim 15, wherein the wheel unit comprises a Very Low Frequency (VLF) receiver, and is configured to report to the display unit occurrences of events in which the VLF receiver detects a VLF signal.

17. The human-propelled cart of claim 14, wherein the display unit includes an audio signal generator capable of outputting an audible alert signal.

18. The human-propelled cart of claim 14, wherein the wheel unit comprises a vibration sensor that senses wheel vibration events, and the wheel unit is configured to report the wheel vibration events to the display unit.

19. The human-propelled cart of claim 14, wherein the wheel unit comprises a magnetic field sensor, and is configured to report to the display unit events in which the magnetic field sensor senses a magnetic marker that is external to the wheel unit.

20. The human-propelled cart of claim 14, wherein the wheel assembly and display unit are configured to communicate with each other over a set of wires that passes through a portion of the cart frame.

21. The human-propelled cart of claim 14, wherein the wheel assembly and display unit are configured to communicate with each other wirelessly.

22. The human-propelled cart of claim 14, wherein the display unit comprises an RFID reader capable of reading RFID data of items placed in the human-propelled cart, and the display unit is configured to display information regarding the items placed in the human-propelled cart.

23. A human-propelled cart, comprising:
a cart frame having a handle;
a display unit attached to the cart frame, the display unit comprising a display, and comprising a radio frequency (RF) transceiver configured to communicate bi-directionally over a wireless network; and
a wheel unit coupled to the frame, the wheel unit comprising a wheel, and comprising circuitry configured to detect at least one type of event in which the wheel unit detects a signal from an external source, the wheel unit additionally comprising communication circuitry configured to report, to the display unit, at least some occurrences of the at least one type of event;
wherein the display unit is configured to report on the wireless network occurrences of at least some of the events detected by the wheel assembly;
wherein the display unit comprises an RFID reader capable of reading RFID data of items placed in the human-propelled cart, and the display unit is configured to display information regarding the items placed in the human-propelled cart;
wherein the display unit is configured to use an output of the RFID reader, in combination with data regarding movement of the human-propelled cart, to determine whether an item detected by the RFID reader is in the human-propelled cart.

24. The human-propelled cart of claim 22, wherein the display unit is configured to report over the wireless network information regarding the items placed in the human-propelled cart.

25. The human-propelled cart of claim 22, wherein the display unit is configured to output recommendations of items related to the items placed in the human-propelled cart.

26. The human-propelled cart of claim 14, wherein the display unit includes a reader capable of reading a user ID from a device of a user of the human-propelled cart, and is configured to report the user ID on the wireless network.

27. A system for tracking use of a human-propelled cart, comprising:
a display unit that attaches to the human-propelled cart, the display unit comprising a display, a controller and a wireless transceiver, the display unit configured to communicate bi-directionally on a wireless network via the wireless transceiver; and
a wheel assembly that attaches to a frame of the human-propelled cart, the wheel assembly comprising a wheel, a controller, and communication circuitry, the controller of the wheel assembly configured to detect at least one type of event in which the wheel assembly detects a signal from a device that is external to the human-propelled cart and the wheel assembly, the controller of the wheel assembly additionally configured to report occurrences of the at least one type of event to the display unit via the communications circuitry;
wherein the controller of the display unit and the controller of the wheel assembly are programmed to communicate bi-directionally with each other over a connection that is separate from the wireless network;
wherein the display unit is programmed to report over the wireless network occurrences of at least some of the events detected by the wheel assembly;
wherein the controller of the display unit and the controller of the wheel assembly are configured to communicate with each other using a one-wire protocol.

28. The human propelled cart of claim 14, A human-propelled cart, comprising:
a cart frame having a handle;
a display unit attached to the cart frame, the display unit comprising a display, a controller and a radio frequency (RF) transceiver, the display unit configured to communicate bi-directionally over a wireless network; and
a wheel unit coupled to the frame, the wheel unit comprising a wheel and a controller, and comprising circuitry configured to detect at least one type of event in which the wheel unit receives a signal from an external source, wherein the controller of the wheel unit is configured to report, to the controller of the display unit, at least some occurrences of the at least one type of event;

wherein the controller of the display unit and the controller of the wheel assembly are configured to communicate bi-directionally with each other over a connection that is separate from the wireless network;

wherein the display unit is configured to report on the wireless network occurrences of at least some of the events detected by the wheel assembly;

wherein the controller of the display unit and the controller of the wheel assembly are configured to communicate with each other using a one-wire protocol.

* * * * *

UNITED STATES PATENT AND TRADEMARK OFFICE
CERTIFICATE OF CORRECTION

PATENT NO. : 9,914,470 B2
APPLICATION NO. : 15/191303
DATED : March 13, 2018
INVENTOR(S) : Stephen E. Hannah Page 1 of 1

It is certified that error appears in the above-identified patent and that said Letters Patent is hereby corrected as shown below:

In the Specification

Column 27 Line 25, change "$f(\ )$" to --$f_0$--.

Column 27 Line 63, change "(C2-05)" to --(C2-C5)--.

Column 27 Line 66, change "C3-05" to --C3-C5--.

In the Claims

Column 32 Line 58, Claim 28 before "A" delete "The human propelled cart of claim 14,".

Signed and Sealed this
Fifth Day of June, 2018

Andrei Iancu
*Director of the United States Patent and Trademark Office*